(12) United States Patent
Na et al.

(10) Patent No.: US 11,032,554 B2
(45) Date of Patent: Jun. 8, 2021

(54) VIDEO ENCODING/DECODING METHOD AND DEVICE FOR CONTROLLING REFERENCE IMAGE DATA ACCORDING TO REFERENCE FREQUENCY

(71) Applicant: SAMSUNG ELECTRONICS CO., LTD., Suwon-si (KR)

(72) Inventors: Sang-kwon Na, Seoul (KR); Sung-oh Kim, Suwon-si (KR); Jae-moon Kim, Uiwang-si (KR); Ki-won Yoo, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/513,230

(22) PCT Filed: Sep. 23, 2015

(86) PCT No.: PCT/KR2015/010019
§ 371 (c)(1),
(2) Date: Mar. 22, 2017

(87) PCT Pub. No.: WO2016/048035
PCT Pub. Date: Mar. 31, 2016

(65) Prior Publication Data
US 2017/0310976 A1 Oct. 26, 2017

(30) Foreign Application Priority Data

Sep. 23, 2014 (KR) .................. 10-2014-0127185

(51) Int. Cl.
*H04N 19/176* (2014.01)
*H04N 19/423* (2014.01)
(Continued)

(52) U.S. Cl.
CPC ......... *H04N 19/176* (2014.11); *H04N 19/172* (2014.11); *H04N 19/423* (2014.11);
(Continued)

(58) Field of Classification Search
CPC .. H04N 19/423; H04N 19/513; H04N 19/517; H04N 19/139; H04N 19/17; H04N 19/46; H04N 19/593
See application file for complete search history.

(56) References Cited

U.S. PATENT DOCUMENTS 9,253,496 B2 2/2016 Nagaraj et al.
2006/0083298 A1 4/2006 Wang et al.
(Continued)

FOREIGN PATENT DOCUMENTS

CN 101065780 A 10/2007
CN 102045557 A 5/2011
(Continued)

OTHER PUBLICATIONS

Communication dated Sep. 19, 2017, from the European Patent Office in counterpart European Application No. 15843911.7.
(Continued)

*Primary Examiner* — Jayanti K Patel
*Assistant Examiner* — Christopher Kingsbury Glover
(74) *Attorney, Agent, or Firm* — Sughrue Mion, PLLC

(57) ABSTRACT

Provided is a video decoding method for reconstructing an image, the video decoding method including: obtaining reference image data from a bitstream; determining an attribute of the reference image data as a long-term reference attribute or a short-term reference attribute, according to a frequency of referring to the reference image data by image data to be decoded; storing the reference image data in a
(Continued)

memory by using the attribute of the reference image data; and decoding an image by using the reference image data stored in the memory.

9 Claims, 29 Drawing Sheets

(51) Int. Cl.
  *H04N 19/58* (2014.01)
  *H04N 19/513* (2014.01)
  *H04N 19/172* (2014.01)
  *H04N 19/517* (2014.01)
  *H04N 19/61* (2014.01)
  *H04N 19/91* (2014.01)
  *H04N 19/46* (2014.01)

(52) U.S. Cl.
  CPC ........... *H04N 19/46* (2014.11); *H04N 19/513* (2014.11); *H04N 19/517* (2014.11); *H04N 19/58* (2014.11); *H04N 19/61* (2014.11); *H04N 19/91* (2014.11)

(56) References Cited

U.S. PATENT DOCUMENTS

| | | | | |
|---|---|---|---|---|
| 2006/0161686 | A1* | 7/2006 | Mossakowski | G06F 16/51 709/247 |
| 2006/0171680 | A1 | 8/2006 | Makino | |
| 2010/0150223 | A1* | 6/2010 | Nagaraj | H04N 19/70 375/240.01 |
| 2011/0090957 | A1 | 4/2011 | Liao et al. | |
| 2012/0304288 | A1* | 11/2012 | Wright | G06F 21/552 726/22 |
| 2013/0077687 | A1* | 3/2013 | Wang | H04N 19/176 375/240.15 |
| 2013/0114741 | A1 | 5/2013 | Sullivan et al. | |
| 2013/0142256 | A1 | 6/2013 | Wang et al. | |
| 2020/0053371 | A1* | 2/2020 | Xu | H04N 19/44 |

FOREIGN PATENT DOCUMENTS

| | | |
|---|---|---|
| CN | 102246522 A | 11/2011 |
| EP | 0 999 706 A2 | 5/2000 |
| KR | 10-2014-0077836 A | 6/2014 |
| KR | 10-2014-0085492 A | 7/2014 |
| KR | 10-2014-0091494 A | 7/2014 |
| KR | 10-1421261 B1 | 7/2014 |
| KR | 10-2014-0100557 A | 8/2014 |

OTHER PUBLICATIONS

Liviu Codrut Stancu et al., "AVid: Annotation Driven Video Decoding for Hybrid Memories", Embedded Systems for Real-Time Multimedia (Estimedia), 2012 IEEE 10th Symposium on, IEEE, Oct. 11, 2012 (10 Pages Total).

Rickard Sjoberg et al., "Overview of HEVC High-Level Syntax and Reference Picture Management", IEEE Transactions on Circuits and Systems for Video Technology, Institute of Electrical and Electronics Engineers, USA, Vol. 22, No. 12, Dec. 2012 (pp. 1858-1870).

Communication dated Jun. 25, 2019 issued by the State Intellectual Property Office of P.R. China in counterpart Chinese Application No. 201580051403.1.

Communication dated Jan. 14, 2016 issued by the International Searching Authority in counterpart International Application PCT/KR2015/010019 (PCT/ISA/210).

Communication dated Aug. 21, 2015 issued by the Korean Intellectual Property Office in counterpart Korean Patent Application No. 10-2014-0127185.

Communication dated Jan. 29, 2016 issued by the Korean Intellectual Property Office in counterpart Korean Patent Application No. 10-2014-0127185.

* cited by examiner

VIDEO ENCODING/DECODING METHOD AND DEVICE FOR CONTROLLING REFERENCE IMAGE DATA ACCORDING TO REFERENCE FREQUENCY

TECHNICAL FIELD

The present disclosure relates to video encoding and decoding methods for encoding an image sequence by using reference image data, and decoding a video stream received by using the reference image data.

BACKGROUND ART

As hardware for reproducing and storing high resolution or high quality video content is being developed and supplied, a need for a video codec for effectively encoding or decoding the high resolution or high quality video content is increasing. According to a conventional video codec, a video is encoded according to a limited encoding method based on a macroblock having a predetermined size.

Image data of a spatial region is transformed into coefficients of a frequency region via frequency transformation. According to a video codec, an image is split into blocks having a predetermined size, discrete cosine transformation (DCT) is performed on each block, and frequency coefficients are encoded in block units, for rapid calculation of frequency transformation. Compared with image data of a spatial region, coefficients of a frequency region are easily compressed. In particular, since an image pixel value of a spatial region is expressed according to a prediction error via inter prediction or intra prediction of a video codec, when frequency transformation is performed on the prediction error, a large amount of data may be transformed to 0. According to a video codec, an amount of data may be reduced by replacing data that is consecutively and repeatedly generated with small-sized data.

A multi-layer video codec encodes and decodes a base layer video and at least one enhancement layer video. Amounts of data of the base layer video and the enhancement layer video may be reduced by removing temporal/spatial redundancy and layer redundancy of the base layer video and the enhancement layer video.

DETAILED DESCRIPTION OF THE INVENTION

Technical Problem

Provided is a decoding apparatus having an improved decoding rate.

Technical Solution

According to an aspect of an embodiment, a video decoding method includes: obtaining reference image data from a bitstream; determining an attribute of the reference image data as a long-term reference attribute or a short-term reference attribute, according to a frequency of referring to the reference image data by image data to be decoded; storing the reference image data in a memory by using the attribute of the reference image data; and decoding an image by using the reference image data stored in the memory.

The determining of the attribute of the reference image data as the long-term reference attribute or the short-term reference attribute according to the frequency of referring to the reference image data by the image data to be decoded may include generating information for identifying reference image data having the long-term reference attribute, and the storing of the reference image data in the memory by using the attribute of the reference image data may include identifying a long-term reference data unit by using the generated information for identifying the reference image data having the long-term reference attribute.

The determining of the attribute of the reference image data as the long-term reference attribute or the short-term reference attribute according to the frequency of referring to the reference image data by the image data to be decoded may include determining the frequency of referring to the reference image data by using a number of motion vectors directing the reference image data.

The determining of the attribute of the reference image data as the long-term reference attribute or the short-term reference attribute according to the frequency of referring to the reference image data by the image data to be decoded may include determining the attribute of the reference image data as the long-term reference attribute when the frequency of referring to the reference image data is equal to or higher than a reference value, and determining the attribute of the reference image data as the short-term reference attribute when the frequency is lower than the reference value.

The reference value may be a value determined according to a distribution of frequencies of referring to all pieces of reference image data.

The determining of the attribute of the reference image data as the long-term reference attribute or the short-term reference attribute according to the frequency of referring to the reference image data by the image data to be decoded may include: obtaining information of a reference picture by parsing the bitstream; determining at least one reference region splitting the reference picture; and determining an attribute of reference image data in the at least one reference region as a long-term reference attribute or a short-term reference attribute according to a frequency of referring to the at least one reference region by the image data to be decoded.

The determining of the attribute of the reference image data in the at least one reference region as the long-term reference attribute or the short-term reference attribute according to the frequency of referring to the at least one reference region by the image data to be decoded may include determining the frequency of referring to the at least one reference region based on a number of motion vectors directing a region in the at least one reference region.

A shape of the at least one reference region may be a square.

The determining of the attribute of the reference image data as the long-term reference attribute or the short-term reference attribute according to the frequency of referring to the reference image data by the image data to be decoded may include determining the attribute of the reference image data as the long-term reference attribute or the short-term reference attribute by using information indicating the attribute of the reference image data.

The storing of the reference image data in the memory by using the attribute of the reference image data may include, when an available storage space of the memory is equal to or lower than a pre-set value, not maintaining reference image data having the short-term reference attribute in the memory.

The storing of the reference image data in the memory by using the attribute of the reference image data may include, when the memory stores only reference image data having the long-term reference attribute and an available storage space of the memory is equal to or lower than a pre-set value, not maintaining, from among the reference image data having the long-term reference attribute, reference image data, in which a time taken to input the reference image data to the memory is longer than those of other pieces of data, or reference image data, in which a reference time is longer than those of other pieces of data, in the memory.

The decoding of the image may be performed by using a plurality of central processing unit (CPU) cores, and the memory may be a shared cache memory used together by the plurality of CPU cores.

According to an aspect of another embodiment, a video encoding method includes: determining an attribute of reference image data generated by encoding an image, as a long-term reference attribute or a short-term reference attribute, according to a frequency of referring to the reference image data by encoded image data; and generating a bitstream including information about the attribute of the reference image data.

The determining of the attribute of the reference image data generated by encoding the image, as the long-term reference attribute or the short-term reference attribute according to the frequency of referring to the reference image data by the encoded image data may include determining the frequency of referring to the reference image data by using a number of motion vectors directing the reference image data.

The determining of the attribute of the reference image data being stored in a memory of a decoding apparatus, as the long-term reference attribute or the short-term reference attribute according to the frequency of referring to the reference image data generated by encoding the image by the encoded image data may include: determining at least one reference region splitting a reference picture; and determining an attribute of reference image data in the at least one reference region as a long-term reference attribute or a short-term reference attribute according to a frequency of referring to the at least one reference region by the encoded image data.

The determining of the attribute of the reference image data in the at least one reference region as the long-term reference attribute or the short-term reference attribute according to the frequency of referring to the at least one reference region may include determining the frequency of referring to the at least one reference region based on a number of motion vectors directing a region in the at least one reference region.

The generating of the bitstream including the information about the attribute of the reference image data may include generating the bitstream including information about the attribute of the reference image data in the at least one reference region, in reference region units.

According to an aspect of another embodiment, a video decoding apparatus includes: a bitstream parser configured to obtain reference image data from a bitstream, and determine an attribute of the reference image data as a long-term reference attribute or a short-term reference attribute, according to a frequency of referring to the reference image data by image data to be decoded; and a decoder configured to store the reference image data in a memory by using the attribute of the reference image data, and decode an image by using the reference image data stored in the memory.

According to an aspect of another embodiment, a video encoding apparatus includes: an encoder configured to generate reference image data by encoding an image; and a bitstream generator configured to determine an attribute of the reference image data as a long-term reference attribute or a short-term reference attribute, according to a frequency of referring to the reference image data by encoded image data, and generate a bitstream including information about the attribute of the reference image data.

According to an aspect of another embodiment, a computer-readable recording medium has recorded thereon a program which, when executed by a computer, performs the video decoding method.

Advantageous Effects of the Invention

A decoding apparatus having an improved decoding rate is provided.

BEST MODE

According to an aspect of an embodiment, a video decoding method includes: obtaining reference image data from a bitstream; determining an attribute of the reference image data as a long-term reference attribute or a short-term reference attribute, according to a frequency of referring to the reference image data by image data to be decoded; storing the reference image data in a memory by using the attribute of the reference image data; and decoding an image by using the reference image data stored in the memory.

The determining of the attribute of the reference image data as the long-term reference attribute or the short-term reference attribute according to the frequency of referring to the reference image data by the image data to be decoded may include generating information for identifying reference image data having the long-term reference attribute, and the storing of the reference image data in the memory by using the attribute of the reference image data may include identifying a long-term reference data unit by using the generated information for identifying the reference image data having the long-term reference attribute.

MODE OF THE INVENTION

Hereinafter, a video encoding apparatus, a video decoding apparatus, a video encoding method, and a video decoding method according to various embodiments will be described with reference to FIGS. 1A through 7B. Also, a video encoding apparatus, a video decoding apparatus, a video encoding method, and a video decoding method based on coding units of a tree structure, according to various embodiments, will be described with reference to FIGS. 8 through 20. Also, various embodiments, to which a video stream encoding method, a video stream decoding method, a video encoding method, and a video decoding method according to embodiments of FIGS. 1A through 20 are applicable, will be described with reference to FIGS. 21 through 27. Hereinafter, an 'image' may denote a still image or a moving image of a video, or a video itself.

An ultra definition television (TV) having resolution of 8 K requires a wide memory bandwidth and a high throughput in order to decode a compressed image. In the ultra definition TV having the resolution of at least 8 K, sampling for encoding and decoding a video is based on at least 10 bit 4:2:2 sampling.

Generally, when 60 frames per second are sampled using 8 bit 4:2:0 sampling at a resolution of 4 K, a required memory bandwidth is about 4.5 GBps. When 60 frames per second are sampled using 10 bit 4:2:2 sampling at a resolution of 8K, a memory bandwidth is calculated to about 28.2 GBps.

In order to solve a throughput problem, a plurality of 4 K decoders may be used. A cache memory may be used as a method of solving a bandwidth problem. Accordingly, a method of efficiently managing the cache memory is required. In particular, a method of efficiently managing the cache memory when a multi-core is used without concurrent processing or a screen split is required.

Figure 1A:
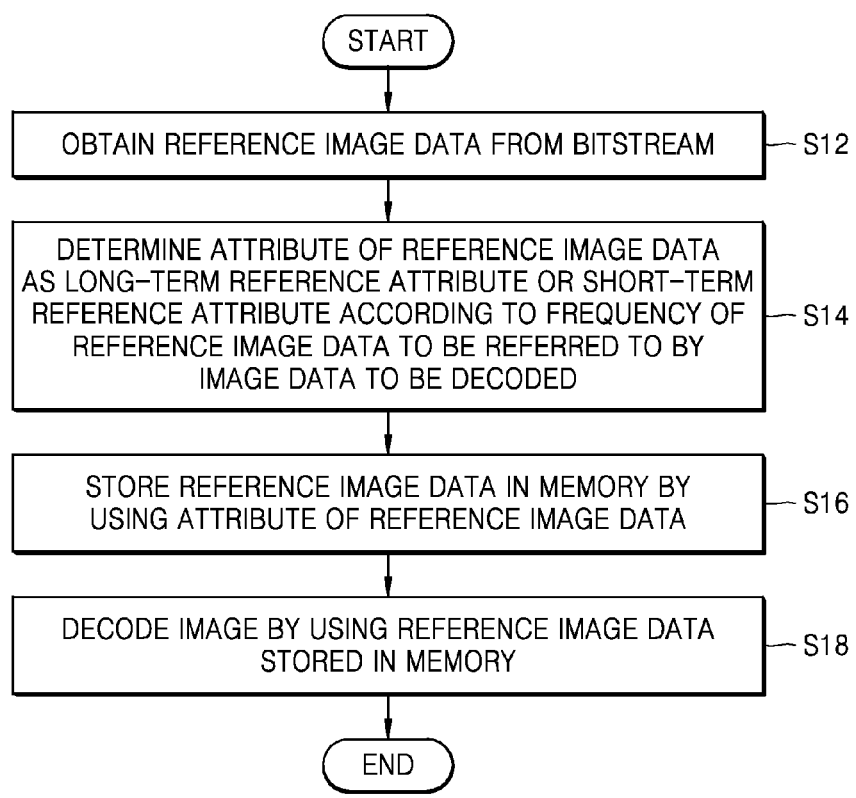
FIG. 1A is a flowchart of a video decoding method performed by a video decoding apparatus, according to various embodiments.
Figure 1B:
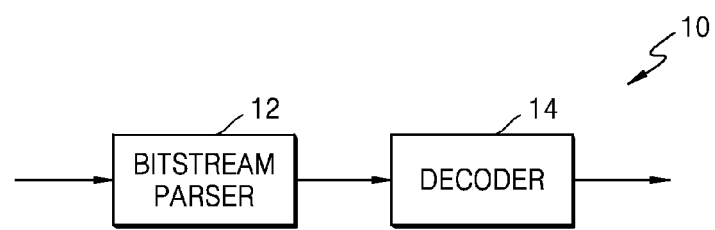
FIG. 1B is a block diagram of a structure of a video decoding apparatus according to various embodiments.

FIG. 1A is a flowchart of a video decoding method performed by a video decoding apparatus 10, according to various embodiments. FIG. 1B is a block diagram of a structure of the video decoding apparatus 10 according to various embodiments.

Hereinafter, the video decoding method performed by the video decoding apparatus 10 according to various embodiments will be described with reference to FIG. 1A. The video decoding apparatus 10 according to various embodiments first obtains reference image data from a bitstream, in operation S12. When image data is generated via prediction, the image data may be decoded by referring to another image data. Image data referred to by the decoding apparatus 10 so as to decode the image data is defined as reference image data. Here, the image data may be a block, coding unit, prediction unit, or transformation unit generated by encoding an image, and may be a slice, a tile, or a picture.

The bitstream may include a string of continuous bits expressing data generated as a video encoding apparatus encodes the image. The video decoding apparatus 10 may receive the bitstream including the encoded image data from the video encoding apparatus. The video decoding apparatus 10 may receive the bitstream from the video encoding apparatus via a wireless or wired communication method.

The video decoding apparatus 10 may parse the bitstream to obtain the image data for decoding the image. The video decoding apparatus 10 may decode the image by using the image data. The image may be encoded to the image data by using prediction, such as inter-prediction or intra-prediction. The video decoding apparatus 10 may decode the image encoded using the prediction, by using the image data and the reference image data.

Then, an attribute of the reference image data is determined as a long-term reference attribute or a short-term reference attribute according to a frequency of referring to the reference image data by the image data to be decoded, in operation S14.

In order to decode the image data, the video decoding apparatus 10 decodes the image data by loading the image data in a memory of a central processing unit (CPU). In order to decode the image data by using the reference image data, the video decoding apparatus 10 decodes the image data by also loading the reference image data in the memory of the CPU. Here, the memory of the CPU may be a cache memory. For example, the memory may be an L1 cache memory, an L2 cache memory, or an L3 cache memory.

Here, an operation of loading certain data in a memory is an operation of storing the certain data at a certain location of the memory. An operation of unloading certain data from a memory is an operation of deleting the certain data stored in the memory, storing another data at a location where the certain data is stored in the memory, or determining that another data may be stored at the location where the certain data is stored in the memory by determining that the location where the certain data is stored in the memory is writable.

Since a size of the memory of the CPU is limited, the video decoding apparatus 10 is unable to load all pieces of reference image data in the memory. According to a method managing a memory of various CPUs, the video decoding apparatus 10 may unload data loaded in a memory according to a time of the data loaded in the memory of the CPU. In order to perform such a data managing method, the video decoding apparatus 10 may separately store and manage a tag indicating a time when data stored at a certain location of a memory is input. The tag may be stored at a certain location of the memory.

According to the method of managing a memory of various CPUs, the video decoding apparatus 10 may unload data loaded in a memory according to a time lapsed after the data loaded in the memory of the CPU was recently used. In order to perform such a data managing method, the video decoding apparatus 10 may separately store and manage a tag indicating a time lapsed after data stored at a certain location of the memory was last used. The tag may be stored at a certain location of the memory.

Also, according to the method of managing memory of various CPUs, the video decoding apparatus 10 may determine an attribute of data to be loaded in a memory of a CPU, and determine whether to unload the data loaded in the memory of the CPU or maintain a loaded state of the data, based on the determined attribute. Here, the maintaining of the loaded state may mean that the data loaded in the memory is not unloaded but is maintained to be loaded.

The video decoding apparatus 10 according to various embodiments may determine a frequency of using the reference image data, and determine the attribute of the reference image data according to the determined frequency. For example, let's consider a case where reference image data used to decode a certain picture is referred to only with respect to a portion of the certain picture. The reference image data referred to once in the certain picture is loaded in the memory once, and is not required to be loaded again in order to decode the certain picture even if the reference image data is deleted from the memory after being referred to.

However, when the reference image data used to decode the certain picture is referred to with respect to several portions of the picture, the reference image data needs to be loaded again in the memory so as to be referred to again if the reference image data is deleted from the memory after being referred to once. Accordingly, a decoding operation is delayed while the reference image data is loaded again in the memory.

The video decoding apparatus 10 according to various embodiments may determine a reference frequency of referring to the reference image data so as to decode the image data by analyzing the parsed image data, and determine the attribute for the reference image data to be managed by the memory of the CPU according to the determined frequency.

Hereinafter, a method of determining the reference frequency of the image data, by the video decoding apparatus 10 according to various embodiments, will be described. The video decoding apparatus 10 according to various embodiments may determine the reference frequency of the reference image data based on the number of reference times of referring to the reference image data so as to decode one picture. For example, the video decoding apparatus 10 may determine the number of reference times of the reference image data being referred to so as to decode one picture as the reference frequency.

In addition, the video decoding apparatus 10 may determine the reference frequency of the reference image data based on the number of reference times of referring to the reference image data so as to decode a plurality of pictures. The video decoding apparatus 10 may determine the number of reference times of the reference image data being referred to so as to decode a pre-determined number of pictures as the reference frequency of the reference image data.

Alternatively, the video decoding apparatus 10 may determine the reference frequency of the reference image data based on the number of reference times of referring to the reference image data so as to decode at least one slice forming one picture or based on the number of reference times of the reference image data being referred to so as to decode at least one tile, according to the above method.

Hereinafter, a method of determining the number of reference times by the video decoding apparatus 10 according to various embodiments will be described. The video decoding apparatus 10 according to various embodiments may use a motion vector so as to determine the number of reference times. For example, the video decoding apparatus 10 may determine the number of times the reference image data is directed by the motion vector as the number of reference times of the reference image data.

A motion vector used to decode certain image data directs reference image data to be referred to so as to decode the certain image data. The video decoding apparatus 10 may determine the number of reference times according to the number of motion vectors directing the reference image data, with respect to the reference image data directed by the motion vector as such. For example, the video decoding apparatus 10 may determine the number of motion vectors directing certain reference image data as the number of reference times of the certain reference image data. Alternatively, the video decoding apparatus 10 may calculate a weight pre-set on the number of motion vectors directing the certain reference image data, and determine the number of reference times of the certain reference image data. A simple example of such calculation includes the four fundamental arithmetic operations.

Hereinafter, a method of determining the attribute of the reference image data according to the reference frequency of the reference image data, by the video decoding apparatus 10 according to various embodiments, will be described.

The video decoding apparatus 10 may determine the attribute of the reference image data as the long-term reference attribute when the reference frequency of the reference image data is high. The video decoding apparatus 10 may determine the attribute of the reference image data as the short-term reference attribute when the reference frequency of the reference image data is low.

The video decoding apparatus 10 may determine that the reference frequency is high when the reference frequency of the reference image data is equal to or higher than a reference value. The video decoding apparatus 10 may determine that the reference frequency is low when the reference frequency of the reference image data is lower than the reference value.

Meanwhile, in order to determine that the reference frequency is high only when the reference frequency of the reference image data exceeds the reference value, the video decoding apparatus 10 may generate a new reference value having a numerical unit higher than the reference value, and determine that the reference frequency is high when the reference frequency of the reference image data is equal to or higher than the new reference value.

The reference value may be set according to a user input, or may be pre-input to the video decoding apparatus 10. Also, the reference value may be dynamically determined according to a distribution of reference frequencies of a plurality of pieces of reference image data. A frequency corresponding to top x % may be set as the reference value such that only pieces of reference image data having the frequency corresponding to the top x % have the long-term reference attribute, according to a distribution of reference frequencies of referring to pieces of reference image data so as to decode one picture. Here, x is a positive real number. For example, a frequency corresponding to top 5% may be set as the reference value such that only pieces of reference image data having the frequency corresponding to the top 5% have the long-term reference attributes, according to a distribution of reference frequencies of pieces of reference image data.

The video decoding apparatus 10 according to various embodiments may define a reference data unit into certain regions, and assign the same attribute to all pieces of reference image data in a certain region. The reference data unit may be a reference picture, a reference slice, or a reference tile.

For example, the video decoding apparatus 10 according to various embodiments may define a reference picture into reference regions, and assign the same attribute to all pieces of reference image data included in a certain reference region. Hereinafter, a method of determining an attribute of reference image data included in a certain reference region after defining a reference picture into certain regions will be described.

First, the video decoding apparatus 10 obtains information of a reference picture by parsing a bitstream. The bitstream may include information about a size of the reference picture, about a slice or tile included in the reference picture, and about reference image data included in the reference picture.

Figure 3:
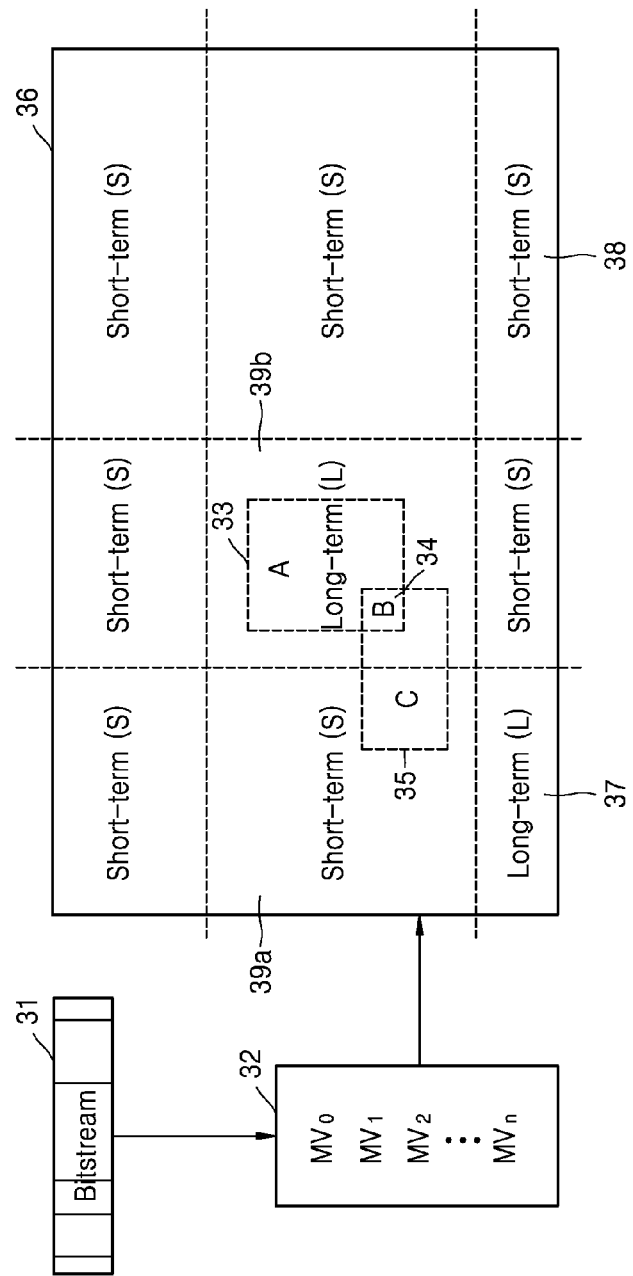
FIG. 3 is a diagram for describing, in detail, a method of managing, by a decoding apparatus, a shared cache, according to various embodiments.

Then, the video decoding apparatus 10 determines at least one reference region by splitting the reference picture. The reference region may be set via any one of various methods. For example, a shape of the reference region may be a rectangle, a square of N×N, or another irregular shape. The shape of the reference region may be determined according to a pre-set shape. FIG. 3 illustrates a reference picture 36 split into reference regions having rectangular shapes. As shown in FIG. 3, the reference picture may be split into reference regions 37 and 38 having rectangular shapes.

Then, the video decoding apparatus 10 determines the attribute of the reference image data in the reference region to be the long-term reference attribute or the short-term reference attribute according to a frequency of referring to the reference region by the image data to be decoded.

The video decoding apparatus 10 may determine the frequency of the reference region in the similar manner as the method of determining the reference frequency of the reference image data, which has been described above. The video decoding apparatus 10 may determine the frequency of referring to the reference region, according to the number of motion vectors directing a region in the reference region, by using the similar method as above.

Referring to FIG. 3, the number of pieces of reference image data directed by bitstreams 32 obtained from the bitstream 31 is determined as the number of times of referring to the reference region, and the frequency of referring to the reference region to may be determined by using the number of times of referring to the reference region. For example, as described above, the number of times of referring to the reference region may be determined as the frequency of referring to the reference region, as described above.

The video decoding apparatus 10 may reduce an amount of the memory used to count the number of reference times by counting the number of reference times with respect to a reference region including reference image data directed by a motion vector, instead of counting the number of reference times with respect to each piece of reference image data directed by the motion vector.

Also, the video decoding apparatus 10 may count the number of reference times with respect to a reference region corresponding to a region at a location directed by a motion vector in a reference picture. Accordingly, the video decoding apparatus 10 may skip separate consideration with respect to reference image data.

The video decoding apparatus 10 may determine an attribute of a reference region as a long-term reference attribute or a short-term reference attribute according to a reference frequency of the reference region, via a similar method as the method of determining the attribute of the reference image data as the long-term reference attribute or the short-term reference attribute according to the frequency, as described above.

The video decoding apparatus 10 may determine the attribute of the reference image data in the reference region, according to the attribute of the reference region. For example, when the attribute of the first reference region 37 is a long-term reference attribute, an attribute of reference image data included in the first reference region 37 has a long-term reference attribute. When an attribute of the second reference region 38 is a short-term reference attribute, an attribute of reference image data included in the second reference region 38 has a short-term reference attribute.

The video decoding apparatus 10 according to various embodiments may define a reference slice or tile into a certain region via the same method as above, and assign the same attribute with respect to all pieces of reference image data included in a certain region.

The video decoding apparatus 10 according to various embodiments may determine the attribute of the reference image data as a long-term reference attribute or a short-term reference attribute by using information indicating the attribute of the reference image data, which is obtained from the bitstream. The information indicating the attribute of the reference image data, which is obtained from the bitstream, may be generated and included in the bitstream by an encoding apparatus.

The video decoding apparatus 10 according to various embodiments may generate information for identifying reference image data having a long-term reference attribute. The video decoding apparatus 10 may generate an attribute tag indicating that the reference image data has the long-term reference attribute, with respect to the reference image data. In the similar manner, the video decoding apparatus 10 may generate an attribute tag indicating that the reference image data has the short-term reference attribute, with respect to the reference image data.

Then, the video decoding apparatus 10 stores the reference image data in the memory by using the attribute of the reference image data, in operation S16.

The video decoding apparatus 10 may store the attribute tag indicating whether the reference image data is the long-term reference attribute or the short-term reference attribute in the memory of the CPU, together with the reference image data. The video decoding apparatus 10 may map and store the attribute tag and the reference image data, in the memory of the CPU. The video decoding apparatus 10 according to various embodiments may map and store, in the memory, the reference image data having the long-term reference attribute with a long-term reference tag. The video decoding apparatus 10 according to various embodiments may map and store, in the memory, the reference image data having the short-term reference attribute with a short-term reference tag.

The video decoding apparatus 10 according to various embodiments may identify long-term reference image data by using information for identifying reference image data having a long-term reference attribute. The video decoding apparatus 10 according to various embodiments may identify an attribute of reference image data by identifying a tag mapped with the reference image data. For example, the video decoding apparatus 10 according to various embodiments may identify reference image data mapped with a long-term reference tag as reference image data having a long-term reference attribute, or identify reference image data mapped with a short-term reference tag as reference image data having a short-term reference attribute.

The video decoding apparatus 10 according to various embodiments may manage the reference image data stored in the memory of the CPU by using attribute information of the reference image data.

The video decoding apparatus 10 according to various embodiments may unload reference image data having a short-term reference attribute from the memory to not maintain the reference image data having the short-term reference attribute, when an available storage space of the memory is equal to or lower than a pre-set value.

The video decoding apparatus 10 according to various embodiments may unload, from the memory, and not maintain reference image data, in which a time taken to input the reference image data to the memory is longer than those of other pieces of data, or reference image data, in which a referenced time is longer than those of other pieces of data, from among reference image data having a long-term reference attribute, when the memory stores only the reference image data having the long-term reference attribute and the available storage space of the memory is equal to or lower than the pre-set value.

Then, the image is decoded by using the reference image data stored in the memory, in operation S18. Various decoding methods generally used may be used as a method of decoding the image.

The video decoding apparatus 10 according to various embodiments may perform decoding by using a plurality of CPU cores. The plurality of CPU cores may perform decoding by using the reference image data stored in a shared cache 24 memory. The video decoding apparatus 10 according to various embodiments may store the reference image data in the shared cache memory, and manage the reference image data by using attribute tag of the reference image data.

The video decoding apparatus 10 performing the video decoding method according to various embodiments will now be described with reference to FIG. 1B. The video decoding apparatus 10 according to various embodiments includes a bitstream parser 12 and a decoder 14.

The bitstream parser 12 obtains data for reconstructing an image by parsing a bitstream. For example, the bitstream parser 12 obtains image data, reference image data, and a motion vector, from the bitstream. The bitstream parser 12 may determine an attribute of the reference image data as a long-term reference attribute or a short-term reference attribute, according to a frequency of referring to the reference image data by image data to be decoded. The bitstream parser 12 may generate information for identifying the reference image data having the long-term reference attribute.

The bitstream parser 12 may determine the frequency of referring to the reference image data by using the number of motion vectors directing the reference image data. The bitstream parser 12 determines the attribute of the reference image data as the long-term reference attribute when the reference frequency of the reference image data is equal to or higher than a reference value, and as the short-term reference attribute when the reference frequency of the reference image data is lower than the reference value. The reference value may be determined according to a distribution of reference frequencies of all pieces of reference image data.

The bitstream parser 12 may obtain information of a reference picture by parsing the bitstream. The bitstream parser 12 may determine at least one reference region splitting the reference picture. The bitstream parser 12 may determine an attribute of reference image data in the reference region as a long-term reference attribute or a short-term reference attribute according to a frequency of referring to the reference region by the image data to be decoded.

The bitstream parser 12 may determine the frequency of referring to the reference region according to the number of motion vectors directing a region in the reference region. A shape of the reference region is not limited. For example, the reference region may have a square shape.

The bitstream parser 12 may determine the attribute of the reference image data as the long-term reference attribute or the short-term reference attribute by using information indicating the attribute of the reference image data, which is obtained from the bitstream.

The decoder 14 performs decoding on an image by using image data included in a bitstream. The decoder 14 may determine an attribute of reference image data as a long-term reference attribute or a short-term reference attribute according to a frequency of referring to the reference image data by the image data to be decoded. The decoder 14 may not separate determine the attribute of the reference image data when the attribute of the reference image data is determined by the bitstream parser 12, and use the attribute information of the reference image data determined by the bitstream parser 12.

The decoder 14 may store the reference image data in a memory by using the attribute of the reference image data. The decoder 14 may decode an image by using the reference image data stored in the memory.

The decoder 14 may identify a long-term reference data unit by using information for identifying the reference image data having the long-term reference attribute. The decoder 14 may unload the reference image data having the short-term reference attribute from the memory when an available storage space of the memory is equal to or lower than a pre-set value.

The decoder 14 may unload, from the memory, reference image data, in which a time taken to input the reference image data to the memory is longer than those of other pieces of data, or reference image data, in which a referenced time is longer than those of other pieces of data, from among reference image data having a long-term reference attribute, when the memory stores only the reference image data having the long-term reference attribute and the available storage space of the memory is equal to or lower than the pre-set value.

The decoder 14 may include a plurality of CPU cores. The plurality of CPU cores may store reference image data in a shared cache memory, and perform decoding on an image by using the reference image data stored in the shared cache memory.

Figure 2:
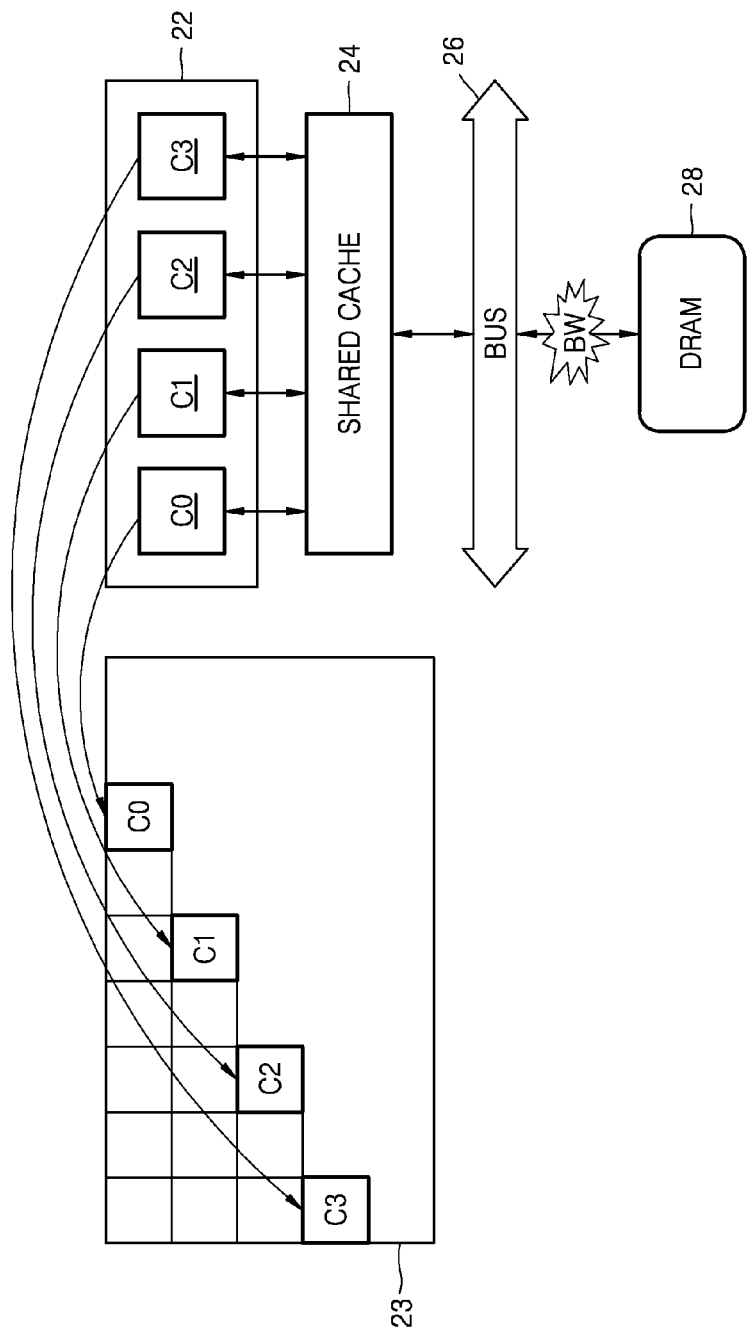
FIG. 2 is a diagram for describing, in detail, a method of decoding, by a decoding apparatus, a reference picture, according to various embodiments.

FIG. 2 is a diagram for describing, in detail, a method of decoding, by the decoding apparatus 10, a reference picture, according to various embodiments. The decoding apparatus 10 according to various embodiments may include a core unit 22, the shared cache 24, a bus 26, and a dynamic random access memory (DRAM) 28.

The core unit 22 loads encoded image data stored in the DRAM 28 in the shared cache in order to decode an image. The core unit 22 decodes the image by using the encoded image data loaded in the shared cache 24. The core unit 22 stores decoded image data generated as a result of decoding the image, in the shared cache. The core unit 22 transmits the image data stored in the shared cache 24 to a display device through the bus 26 so as to provide the decoded image to a user through the display device connected to the bus 26.

The core unit 22 transmits the decoded image data stored in the shared cache 24 to the DRAM 28, and unload the decoded image data from the shared cache. For example, when an available space of the shared cache is lower than a pre-set value, the core unit 22 may copy the decoded image data stored in the shared cache to the DRAM 28 and unload the decoded image data from the shared cache.

The core unit 22 may include one core, but as shown in FIG. 2, may include a plurality of cores C0 through C3. When the core unit 22 includes a plurality of CPU cores as shown in FIG. 2, each core of the core unit 22 may independently decode each portion of a current picture 23 being decoded. FIG. 2 illustrates an example of each core independently decoding image data of the current picture 23. For example, the core C0 decodes C0 image data of the current picture, and the core C1 decodes C1 image data of the current picture.

Each core of the core unit 22 may use the shared cache 24 as a cache memory used together. Certain data of the shared cache 24 may be referred to by the cores. For example, the same reference image data may be referred to so as to decode the C0 image data and the C1 image data. The cores C0 and C1 may use the same reference image data stored in the shared cache 24.

When certain reference image data is unloaded from the shared cache 24 after determining that the core C0 will no longer use the certain reference image data, the core C1 needs to load the certain reference image data again from the DRAM 28 since the certain reference image data does not exist in the shared cache. A decoding operation of the core C1 is delayed by a time taken for the certain reference data to be loaded again in the shared cache 24.

When a concurrent processing technique or a screen split is not used while performing decoding, the decoding apparatus 10 according to various embodiments may divide and process image data in each core with respect to a time difference for a real-time process. For example, the decoding apparatus 10 may perform decoding by using the plurality of cores when there is no restriction of a tile or slice in a bitstream.

The decoding apparatus 10 according to various embodiments may process entropy decoding in picture units. The decoding apparatus 10 may obtain information of a motion vector in a picture by processing the entropy decoding in picture units. The decoding apparatus 10 may determine a reference frequency of reference image data by pre-analyzing the information of the motion vector in the picture, which is obtained while parsing the bitstream.

FIG. 3 is a diagram for describing, in detail, a method of managing, by the decoding apparatus 10, the shared cache 24, according to various embodiments.

FIG. 3 is a diagram of the reference regions obtained by splitting the reference picture 36 in rectangular shapes. As shown in FIG. 3, the reference picture 36 may be split into the reference regions 37 and 38 having rectangular shapes.

The decoding apparatus 10 according to various embodiments may determine the number of reference times of reference image data as directed by a motion vector. The decoding apparatus 10 may determine the number of reference times of a reference region as directed by a motion vector. As described above, the decoding apparatus 10 according to various embodiments may determine the number of times of referring to the reference region as a frequency of referring to the reference region. The video decoding apparatus 10 may determine an attribute of the reference region as a long-term reference attribute or a short-term reference attribute according to the reference frequency of the reference region, according to the method described above.

The video decoding apparatus 10 may determine an attribute of reference image data included in the reference region, according to the attribute of the reference region. For example, when an attribute of the first reference region 37 is a long-term attribute, an attribute of reference image data included in the first reference region 37 has a long-term reference attribute. When an attribute of the second reference region 38 is a short-term reference attribute, an attribute of reference image data included in the second reference region 38 has a short-term reference attribute. As such, each region of the reference picture 36 has a long-term reference attribute or a short-term reference attribute.

A method of determining the number of reference times of the reference image data, and a method of determining the number of reference times of the reference region, which are performed by the decoding apparatus 10 according to various embodiments, will be described in detail with reference to FIG. 3. The decoding apparatus 10 according to various embodiments may determine the number of times of referring to the reference image data by using the reference image data directed by the motion vector obtained from the bitstream 31.

For example, when one motion vector directs certain reference image data, the decoding apparatus 10 may increase the number of reference times of the directed certain reference image data by one. For example, the decoding apparatus 10 may calculate the number of times of referring to the reference image data by increasing a count of each piece of reference image data whenever the reference image data is directed by the motion vector 32 obtained by parsing the bitstream 31.

In the example of FIG. 3, let's assume that a motion vector MV0 directs reference image data A 33 of the reference picture 36, motion vectors MV1 through MV3 direct reference image data B 34, and motion vectors MV4 and MV5 direct reference image data C 35.

Since only the motion vector MV0 directs the reference image data A 33, the decoding apparatus 10 may determine the number of reference times of the reference image data A 33 to be 1. Since the motion vectors MV1 through MV3 direct the reference image data B 34, the decoding apparatus 10 may determine the number of reference times of the reference image data B 34 to be 3. Since the motion vectors MV4 and MV5 direct the reference image data C 35, the decoding apparatus 10 may determine the number of reference times of the reference image data C 35 to be 2.

The decoding apparatus 10 according to various embodiments may determine the number of pieces of reference image data directed by the motion vectors 32 obtained from the bitstream 31 as the number of times of referring to a reference region, and determine a frequency of referring to a reference region by using the number of times of referring to the reference region. For example, the decoding apparatus 10 may determine the number of times of referring to the reference region in consideration of only the number of pieces of reference image data included in the reference region, without considering the number of times of referring to each piece of reference image data.

When reference image data corresponds to one reference region, the decoding apparatus 10 may count only the number of reference times of the one reference region. When reference image data corresponds to a plurality of reference regions, the decoding apparatus 10 may count the number of reference times of each of the plurality of reference regions. For example, when a part of reference image data corresponding to a plurality of reference regions, the decoding apparatus 10 may count the number of reference times of each of the plurality of reference regions to which the part of the reference image data corresponds.

For example, according to the above assumption with respect to FIG. 3, the decoding apparatus 10 may determine that the reference image data A 33 and the reference image data B 34 correspond to a third reference region 39b. The decoding apparatus 10 may determine that the reference image data C 35 correspond to the third reference region 39b and a fourth reference region 39a.

Accordingly, in the example of FIG. 3, since the third reference region 39b of the reference picture 36 includes 3 pieces of reference image data, the decoding apparatus 10 may determine the number of reference times of the third reference region 39b to be 3. Since the fourth reference region 39a of the reference picture 36 includes one piece of reference image data, the decoding apparatus 10 may determine the number of reference times of the fourth reference region 39a to be 1.

The decoding apparatus 10 according to various embodiments may determine a sum of the numbers of times of referring to pieces of reference image data included in a reference region by the motion vectors 32 obtained from the bitstream 31 as the number of times of referring to the reference region, and determine a frequency of referring to the reference region by using the number of times of referring to the reference region. For example, the decoding apparatus 10 may determine the sum of the numbers of times of referring to the pieces of the reference image data included in the reference region as the number of times of referring to the reference region.

As such, when reference image data corresponds to one reference region, the decoding apparatus 10 may count only the number of reference times of the one reference region. When a part of reference image data corresponds to a plurality of reference regions, the decoding apparatus 10 may count the number of reference times of each of the reference regions to which the part of the reference image data corresponds.

For example, according to the above assumption with respect to FIG. 3, the decoding apparatus 10 may determine that the reference image data A 33 and the reference image data B 34 correspond to a third reference region 39b. The decoding apparatus 10 may determine that the reference image data C 35 correspond to the third reference region 39b and a fourth reference region 39a.

Accordingly, in the example of FIG. 3, since the third reference region 39b of the reference picture 36 includes 3 pieces of reference image data, the decoding apparatus 10 may determine the number of reference times of the third reference region 39b by adding the numbers of reference times of the 3 pieces of reference image data. The decoding apparatus 10 may determine the number of reference times of the third reference region 39b to be 6 by adding the number of reference times, i.e., 1, of the reference image data A 33 directed by the motion vector MV0, the number of reference times, i.e., 3, of the reference image data B 34 directed by the motion vectors MV1 through MV3, and the number of reference times, i.e., 2, of the reference image data C 35 directed by the motion vectors MV4 and MV5.

In the similar manner, since the fourth reference region 39a of the reference picture 36 includes only the reference image data C 35, the decoding apparatus 10 may determine the number of reference times of the fourth reference region 39a to be 2, i.e., the number of reference times of the reference image data C 35.

The decoding apparatus 10 according to various embodiments may determine a reference attribute of a reference region having a high frequency of use or a reference region that is commonly used between cores to be a long-term reference attribute as described above, when a multi-core operates at coding tree unit (CTU) intervals.

For example, when a first core and a second core independently perform decoding by referring to the third reference region 39b of the reference picture 36, the decoding apparatus 10 may determine an attribute of the third reference region 39b to be a long-term reference attribute.

When the first core and the second core perform decoding by referring to the reference image data A 33, the decoding apparatus 10 according to various embodiments may determine an attribute of the third reference region 39b to be a long-term reference attribute. Alternatively, when the first core and the second core perform decoding by referring to the reference image data A 33, the decoding apparatus 10 may determine an attribute of the reference image data A 33 to be a long-term reference attribute.

When the first core and the second core perform decoding by referring to the reference image data C 35, the decoding apparatus 10 according to various embodiments may determine attributes of the third reference region 39b and the fourth reference region 39a to be long-term reference attributes. Alternatively, when the first core and the second core perform decoding by referring to the reference image data C 35, the decoding apparatus 10 may determine an attribute of the reference image data C 35 to be a long-term reference attribute.

When the first core performs decoding by referring to the third reference region 39b and the second core performs decoding by referring to the fourth reference region 39a, the decoding apparatus 10 according to various embodiments may determine reference image data having a part included in each of the third and fourth reference regions 39b and 39a to have a long-term reference attribute. For example, the decoding apparatus 10 may determine an attribute of the reference image data C 35 to be a long-term reference attribute.

The decoding apparatus 10 according to various embodiments may store data having a long-term reference attribute in a cache together with a tag indicating the long-term reference attribute. The decoding apparatus 10 according to various embodiments may priorly maintain data stored in a cache memory by being matched to a tag indicating a long-term reference attribute, in the cache memory compared to other data.

Figure 4:
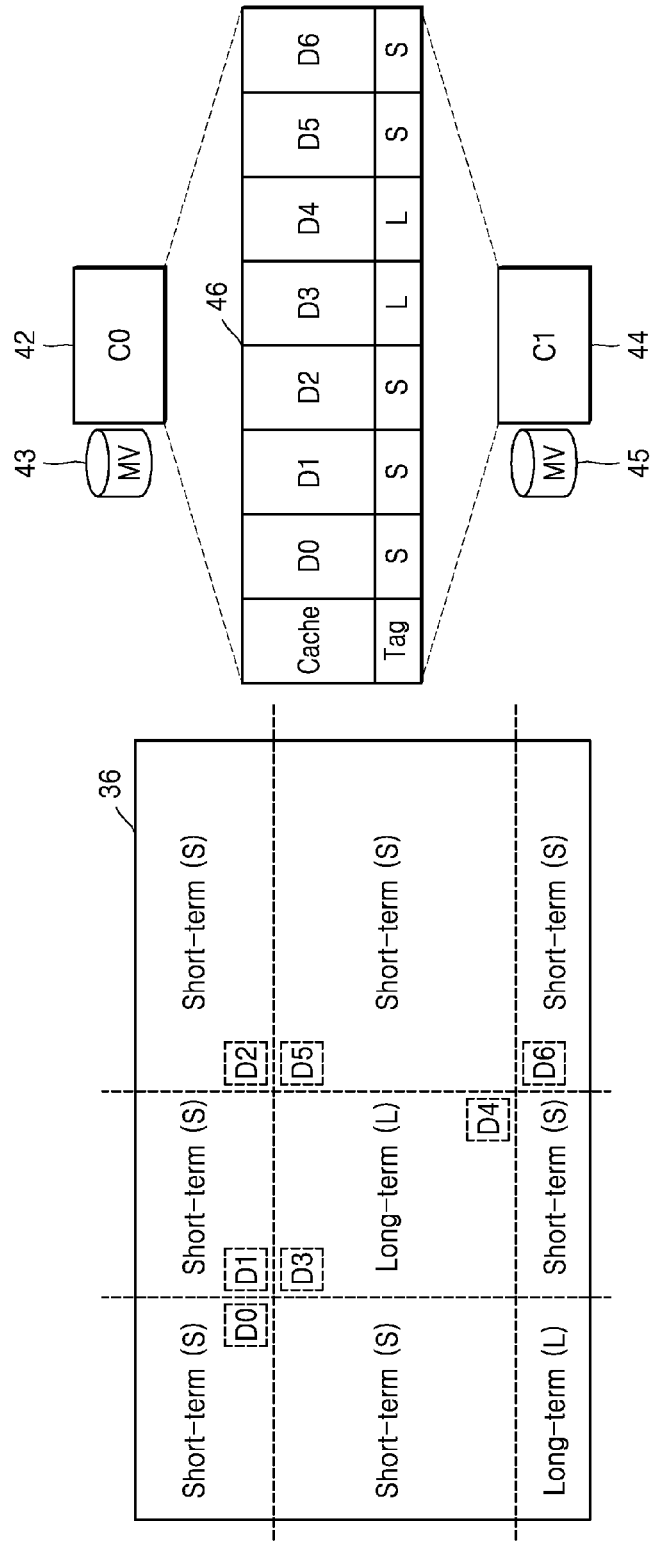
FIGS. 4 through 6 are conceptual diagrams for describing a method of managing, by a video decoding apparatus, reference image data from a shared cache, according to various embodiments.
Figure 5:
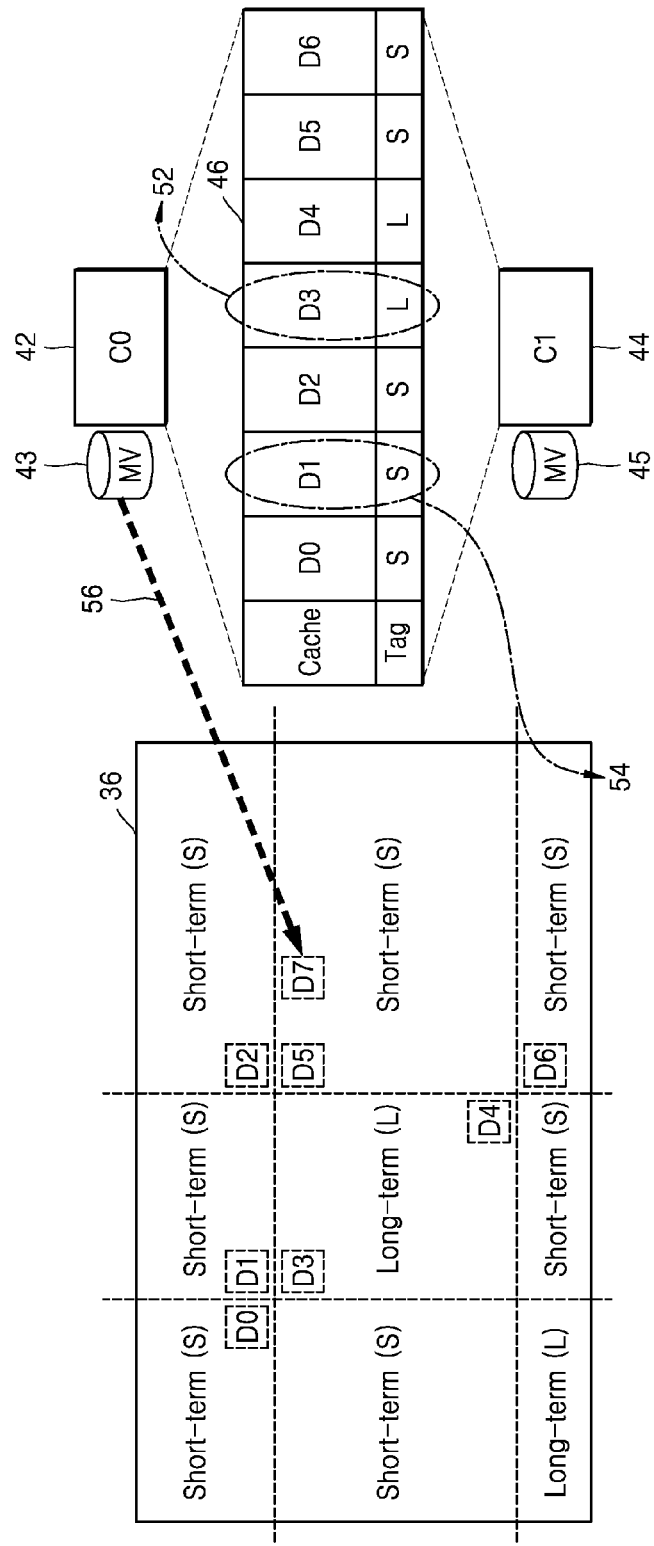
Figure 6:
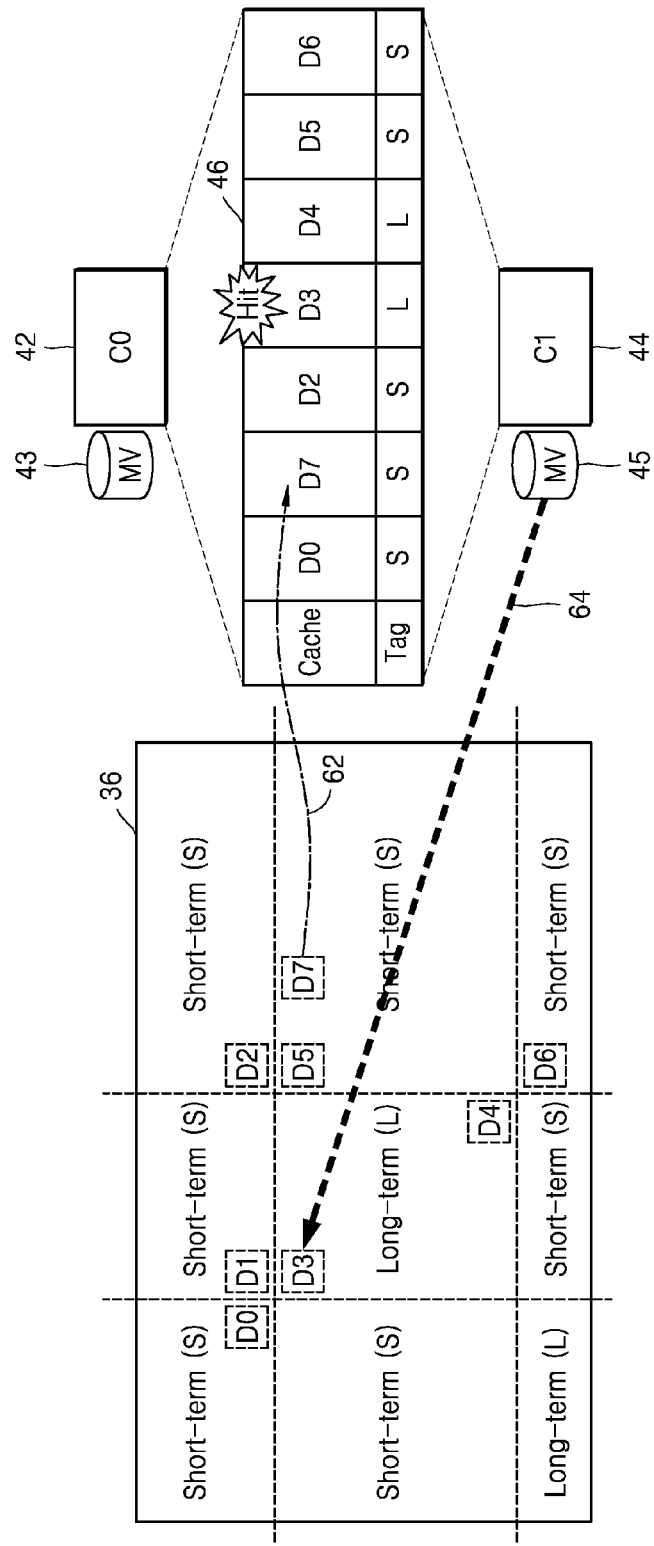

FIGS. 4 through 6 are conceptual diagrams for describing a method of managing, by the video decoding apparatus 10, reference image data from a shared cache 46, according to various embodiments.

FIG. 4 illustrates a structure of the shared cache 46 in which pieces of reference image data D0 through D6 are sequentially stored. Attributes of the pieces of reference image data D0 through D6 are set according to an attribute of a reference region of the reference picture 36. The shared cache 46 stores an attribute tag indicating an attribute of reference image data, which is matched to the pieces of reference image data D0 through D6. In FIG. 5, S denotes a short-term reference tag and L denotes a long-term reference tag.

FIG. 5 is a conceptual diagram for describing a method of selecting reference image data to be unloaded from the shared cache 46.

Reference image data D7 needs to be loaded in the shared cache 46 for a core C0 42 to refer to the reference image data D7 of the reference picture 36, according to a reference direction 56 of a motion vector MV 43. Since an available storage space of the current shared cache 46 is insufficient, the core C0 42 needs to unload one of pieces of reference image data stored in the shared cache 46 and load the reference image data D7 in a memory location where the piece of the reference image data is unloaded.

According to a general cache memory managing method that does not consider an attribute of data, the data to be unloaded may be the reference image data D3. However, the core C0 42 may select data to be unloaded from reference image data having a short-term reference tag, by comparing attribute tags stored in the shared cache 46. For example, the core C0 42 may select and unload the reference image data D1 from the reference image data having the short-term reference tag. The core C0 42 may load the reference image data D7 at a location of the reference image data D1 in the shared cache 46, store S as an attribute tag of the reference image data D7 to indicate that an attribute of the reference image data D7 is a short-term reference attribute.

FIG. 6 is a conceptual diagram for describing a shared cache in which reference image data is updated, in a video decoding method according to various embodiments.

FIG. 6 illustrates a state of the shared cache 46, in which the core C0 42 unloaded the reference image data D1 and loaded the reference image data D7 at the location of the reference image data D1 in the shared cache 46. After the core C0 42 refers to the reference image data D7, a core C1 44 refers to the reference image data D3 according to a reference direction 64 of a motion vector 45. Since the reference image data D3 is not unloaded in a previous operation by being tagged by a long-term reference tag, the core C1 44 may refer to the reference image data D3 from the shared cache 46. If the reference image data D3 was unloaded in the previous operation without consideration of an attribute of data, the core C1 44 may have to load the reference image data D3 of the reference picture 46 again from the memory.

Figure 7A:
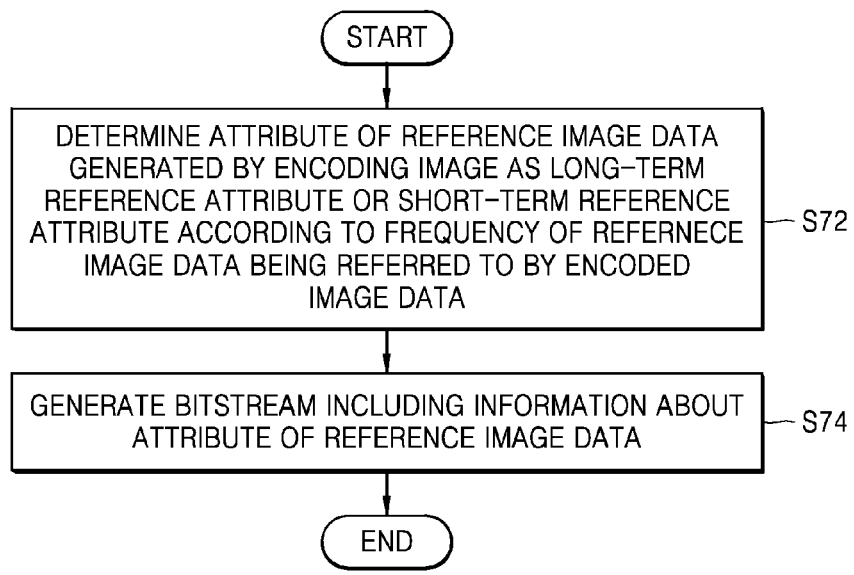
FIG. 7A is a flowchart of a video encoding method performed by a video encoding apparatus, according to various embodiments.
Figure 7B:
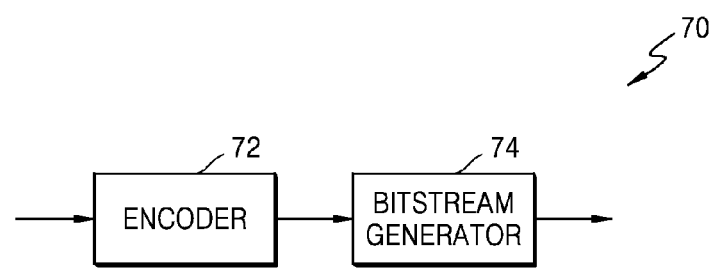
FIG. 7B is a block diagram of a structure of a video encoding apparatus according to various embodiments.

FIG. 7A is a flowchart of a video encoding method performed by a video encoding apparatus 70, according to various embodiments. FIG. 7B is a block diagram of a structure of the video encoding apparatus 70 according to various embodiments.

The video encoding apparatus 70 may generate and transmit attribute information of reference image data to the decoding apparatus 10 such that the video decoding apparatus 10 manages the reference image data in a cache memory by using the attribute information of the reference image data, as described above.

The video encoding apparatus 70 may generate the attribute information of the reference image data via the method of generating, by the video decoding apparatus 10, attribute information of reference image data.

The video encoding apparatus 70 may generate a bitstream including the generated attribute information of the reference image data. The bitstream may include a string of continuous bits expressing data generated as the video encoding apparatus 70 encodes an image. The video encoding apparatus 70 may transmit the bitstream including the attribute information of the reference image data to the decoding apparatus 10. The video encoding apparatus 70 may transmit the bitstream to the video decoding apparatus 10 via a wireless or wired communication method.

Hereinafter, a video encoding method performed by the video encoding apparatus 70 according to various embodiments will be described with reference to FIG. 7A. The video encoding apparatus 70 according to various embodiments first determines an attribute of reference image data generated by encoding an image as a long-term reference attribute or a short-term reference attribute according to a frequency of referring to the reference image data by encoded image data, in operation S72.

The video encoding apparatus 70 may generate the image data by encoding the image. The image may be encoded to the image data by using prediction, such as inter-prediction or intra-prediction. The video encoding apparatus 70 may generate the reference image data and the encoded image data by encoding the image by using prediction.

When the image is to be decoded by using the encoded image data, the video encoding apparatus 70 according to various embodiments may determine a frequency of using the reference image data, and determine an attribute of the reference image data according to the determined frequency.

The video encoding apparatus 70 according to various embodiments may determine a reference frequency of referring to the reference image data so as to decode the image data by analyzing the image data generated by performing encoding, and determine an attribute of the reference image data to be managed by a memory of a CPU according to the determined frequency.

Hereinafter, a method of determining a reference frequency of image data by the video encoding apparatus 70 according to various embodiments will be described. The video encoding apparatus 70 according to various embodiments may determine a reference frequency of the reference image data based on the number of reference times of referring to the reference image data so as to decode one picture. For example, the video decoding apparatus 70 may determine the number of reference times of referring to the reference image data so as to decode one picture as the reference frequency.

In addition, the video encoding apparatus 70 may determine the reference frequency of the reference image data based on the number of reference times of referring to the reference image data so as to decode a plurality of pictures. The video encoding apparatus 70 may determine the number of reference times of referring to the reference image data so as to decode a pre-determined number of pictures as the reference frequency of the reference image data.

Alternatively, the video encoding apparatus 70 may determine the reference frequency of the reference image data based on the number of reference times of referring to the reference image data so as to decode at least one slice forming one picture, or based on the number of reference times of referring to the reference image data so as to decode at least one tile.

Hereinafter, a method of determining the number of reference times, by the video encoding apparatus 70 according to various embodiments will be described. The video encoding apparatus 70 according to various embodiments may use a motion vector so as to determine the number of reference times. For example, the video encoding apparatus 70 may determine the number of times the reference image data is directed by the motion vector as the number of reference times of the reference image data.

The motion vector generated as the video encoding apparatus 70 encodes the image directs the reference image data to be referred to so as to decode certain image data. As described above, the video encoding apparatus 70 may determine the number of reference times according to the number of motion vectors directing the reference image data, with respect to the reference image data directed by the motion vector. For example, the video encoding apparatus 70 may determine the number of motion vectors directing certain reference image data as the number of reference times of the certain reference image data. Alternatively, the video encoding apparatus 70 may calculate a weight pre-set on the number of motion vectors directing the certain reference image data, and determine the number of reference times of the certain reference image data. A simple example of such calculation includes the four fundamental arithmetic operations.

Hereinafter, a method of determining the attribute of the reference image data according to the reference frequency of the reference image data, by the video encoding apparatus 70 according to various embodiments, will be described.

The video encoding apparatus 70 may determine the attribute of the reference image data as the long-term reference attribute when the reference frequency of the reference image data is high. The video encoding apparatus 70 may determine the attribute of the reference image data as the short-term reference attribute when the reference frequency of the reference image data is low.

The video encoding apparatus 70 may determine that the reference frequency is high when the reference frequency of the reference image data is equal to or higher than a reference value. The video encoding apparatus 70 may determine that the reference frequency is low when the reference frequency of the reference image data is lower than the reference value.

Meanwhile, in order to determine that the reference frequency is high only when the reference frequency of the reference image data exceeds the reference value, the video encoding apparatus 70 may generate a new reference value having a numerical unit higher than the reference value, and determine that the reference frequency is high when the reference frequency of the reference image data is equal to or higher than the new reference value.

The reference value may be set according to a user input, or may be pre-input to the video encoding apparatus 70. Also, the reference value may be dynamically determined according to a distribution of reference frequencies of a plurality of pieces of reference image data. A frequency corresponding to top x % may be set as the reference value such that only pieces of reference image data having the frequency corresponding to the top x % have the long-term reference attribute, according to a distribution of reference frequencies of referring to pieces of reference image data so as to decode one picture. Here, x is a positive real number.

For example, a frequency corresponding to top 5% may be set as the reference value such that only pieces of reference image data having the frequency corresponding to the top 5% have the long-term reference attributes, according to a distribution of reference frequencies of pieces of reference image data.

The video encoding apparatus 70 according to various embodiments may define a reference data unit into certain regions, and assign the same attribute to all pieces of reference image data in a certain region. The reference data unit may be a reference picture, a reference slice, or a reference tile.

For example, the video encoding apparatus 70 according to various embodiments may define a reference picture into reference regions, and assign the same attribute to all pieces of reference image data included in a certain reference region. Hereinafter, a method of determining an attribute of reference image data included in a certain reference region after defining a reference picture into certain regions will be described.

First, the video encoding apparatus 70 obtains information of a reference picture by parsing a bitstream. The bitstream may include information about a size of the reference picture, about a slice or tile included in the reference picture, and about reference image data included in the reference picture.

Then, the video encoding apparatus 70 determines at least one reference region by splitting the reference picture. The reference region may be set via any one of various methods. For example, a shape of the reference region may be a rectangle, a square, or another irregular shape. The shape of the reference region may be determined according to a pre-set shape. FIG. 3 illustrates the reference picture 36 split into reference regions having rectangular shapes. As shown in FIG. 3, the reference picture may be split into the reference regions 37 and 38 having rectangular shapes.

Then, the video encoding apparatus 70 determines the attribute of the reference image data in the reference region to be the long-term reference attribute or the short-term reference attribute according to a frequency of referring to the reference region by the image data to be decoded.

The video encoding apparatus 70 may determine the frequency of the reference region in the similar manner as the method of determining the reference frequency of the reference image data, which has been described above. The video encoding apparatus 70 may determine the frequency of referring to the reference region, according to the number of motion vectors directing a region in the reference region, by using the similar method as above.

The video encoding apparatus 70 may reduce an amount of the memory used to count the number of reference times by counting the number of reference times with respect to a reference region including reference image data directed by a motion vector, instead of counting the number of reference times with respect to each piece of reference image data directed by the motion vector.

Also, the video encoding apparatus 70 may count the number of reference times with respect to a reference region corresponding to a region at a location directed by a motion vector in a reference picture. Accordingly, the video encoding apparatus 70 may skip separate consideration with respect to reference image data.

The video encoding apparatus 70 may determine an attribute of a reference region as a long-term reference attribute or a short-term reference attribute according to a reference frequency of the reference region, via a similar method as the method of determining the attribute of the reference image data as the long-term reference attribute or the short-term reference attribute according to the frequency, as described above. The video encoding apparatus 70 may determine the attribute of the reference image data in the reference region, according to the attribute of the reference region.

The video encoding apparatus 70 according to various embodiments may define a reference slice or tile into a certain region via the same method as above, and assign the same attribute with respect to all pieces of reference image data included in a certain region.

The video encoding apparatus 70 according to various embodiments may generate a bitstream including the information about the attribute of the reference image data, in operation S74. The video encoding apparatus 70 according to various embodiments may generate the bitstream including information for identifying the reference image data having the long-term reference attribute. The video encoding apparatus 70 may generate the bitstream including an attribute tag indicating that the reference image data has the long-term reference attribute. In the similar manner, the video encoding apparatus 70 may generate the bitstream including an attribute tag indicating that the reference image data has the short-term reference attribute.

The video encoding apparatus 70 may define a reference data unit into certain regions, and generate the bitstream including information about an attribute of a certain region. For example, the video encoding apparatus 70 may define a reference picture into a reference region, determine a reference attribute of each reference region according to the method described above, and generate a bitstream including information about the attribute of the reference region. Alternatively, the video encoding apparatus 70 may define a reference slice or tile into a reference region, determine a reference attribute of each reference region according to the method described above, and generate a bitstream including information about the attribute of each reference region.

The video encoding apparatus 70 may generate a bitstream including only information about an attribute of a reference region or reference image data having a long-term reference attribute. When there is no information about an attribute in the bitstream, the decoding apparatus 10 that received the bitstream may determine that a reference region or reference image data has a short-term reference attribute. In the similar manner, the video encoding apparatus 70 may generate a bitstream only including information about an attribute of a reference region or reference image data having a short-term reference attribute. When there is no information about an attribute in the bitstream, the decoding apparatus 10 that received the bitstream may determine that a reference region or reference image data has a long-term reference attribute.

Hereinafter, the video encoding apparatus 70 performing a video encoding method according to various embodiments will be described with reference to FIG. 7B. The video encoding apparatus 70 according to various embodiments includes an encoder 72 and a bitstream generator 74.

The encoder 72 generates encoded data of an image by encoding the image. For example, the encoder 72 generates image data, reference image data, and a motion vector by encoding the image.

The bitstream generator 74 determines an attribute of the reference image data as a long-term reference attribute or a short-term reference attribute, according to a frequency of referring to the reference image data by the image data so as to decode the image data. The bitstream generator generates a bitstream including information about the attribute of the reference image data.

The bitstream generator 74 may determine the attribute of the reference image data as a long-term reference attribute or a short-term reference attribute according to a frequency of referring to the reference image data by the image data to be decoded. The encoder 72 may generate information for identifying the reference image data having a long-term reference attribute.

The bitstream generator 74 may determine the frequency of referring to the reference image data by using the number of motion vectors directing the reference image data. The bitstream generator 74 may determine the attribute of the reference image data as a long-term reference attribute when the reference frequency of the reference image data is equal to or higher than a reference value, and as a short-term reference attribute when the reference frequency of the reference image data is lower than the reference value. The reference value may be determined according to a distribution of reference frequencies of all pieces of reference image data.

The bitstream generator 74 may determine at least one reference region splitting a reference picture. The bitstream generator 74 may determine an attribute of reference image data in the reference region as a long-term reference attribute or a short-term reference attribute according to a frequency of referring to the reference region by the image data to be decoded.

The bitstream generator 74 may determine the frequency of referring to the reference region according to the number of motion vectors directing a region in the reference region. A shape of the reference region is not limited. For example, the reference region may have a rectangular shape.

The bitstream generator 74 may generate a bitstream including information about the attribute of the reference image data.

The video encoding apparatus 70 of FIG. 7B may generate samples by performing intra prediction, inter prediction, inter-layer prediction, transformation, and quantization according to image blocks, and output a bitstream by performing entropy-encoding on the samples. In order to output a video encoding result, i.e., a base layer video stream and an enhancement layer video stream, the video encoding apparatus 70 according to an embodiment may operate in cooperation with an internal video encoding processor installed therein or an external video encoding processor so as to perform video encoding operations including transformation and quantization. The internal video encoding processor of the video encoding apparatus 70 according to an embodiment may be a separate processor, or alternatively, a video encoding apparatus, a central processing apparatus, or a graphic processing apparatus may include a video encoding processing module to perform the video encoding operations.

Also, the video decoding apparatus 10 of FIG. 1B decodes a received base layer video stream and a received enhancement layer video stream. In other words, inverse quantization, inverse transformation, intra prediction, and motion compensation (inter-motion compensation and inter-layer disparity compensation) are performed according to image blocks with respect to the base layer video stream and the enhancement layer video stream to reconstruct samples of base layer images from the base layer video stream and samples of enhancement layer images from the enhancement layer video stream. In order to output a reconstructed image generated as a decoding result, the video decoding apparatus 70 according to an embodiment may operate in cooperation with an internal video decoding processor installed therein or an external video decoding processor so as to perform video restoration operations including inverse quantization, inverse transformation, and prediction/compensation. The internal video decoding processor of the video decoding apparatus 70 according to an embodiment may be a separate processor, or alternatively, a video decoding apparatus, a central processing apparatus, or a graphic processing apparatus may include a video decoding processing module to perform the video restoration operations.

In the video encoding apparatus 70 according to an embodiment and the video decoding apparatus 70 according to an embodiment, as described above, video data may be split into coding units having a tree structure, and coding units, prediction units, and transformation units are used for inter layer prediction or inter prediction on the coding units. Hereinafter, a video encoding method and apparatus and a video decoding method and apparatus based on coding units and transformation units having a tree structure according to an embodiment will be described with reference to FIGS. 8 through 20.

In principle, during encoding/decoding for multi-layer video, encoding/decoding processes for base layer images and encoding/decoding processes for enhancement layer images are separately performed. That is, when inter-layer prediction is performed on a multi-layer video, encoding/decoding results of a single-layer video are referred to each other, but separate encoding/decoding processes are performed for respective single-layer videos.

For convenience of description, since a video encoding process and a video decoding process based on a coding unit of a tree structure, which will be described with reference to FIGS. 8 through 20, are performed on a single-layer video, inter prediction and motion compensation will be described. However, as described with reference to FIGS. 1A through 7B, inter-layer prediction and compensation between base view images and enhancement layer images are performed to encode/decode a video stream.

Figure 8:
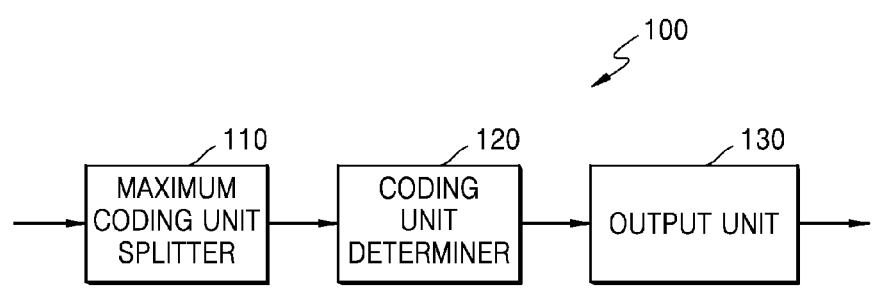
FIG. 8 is a block diagram of a video encoding apparatus based on coding units according to a tree structure, according to various embodiments.

Accordingly, in order for the encoder 72 of video encoding apparatus 70 according to an embodiment to encode a multi-layer video based on coding units having a tree structure, the video encoding apparatus 70 may include as many video encoding apparatuses 100 of FIG. 8 as the number of layers of the multi-layer video so as to perform video encoding according to each single-layer video, thereby controlling each video encoding apparatus 100 to encode an assigned single-layer video. Also, the video encoding apparatus 70 may perform inter-view prediction by using an encoding result of individual single views of each video encoding apparatus 100. Accordingly, the encoder 72 of the video encoding apparatus 70 may generate a base view video stream and an enhancement layer video stream, which include encoding results according to layers.

Figure 9:
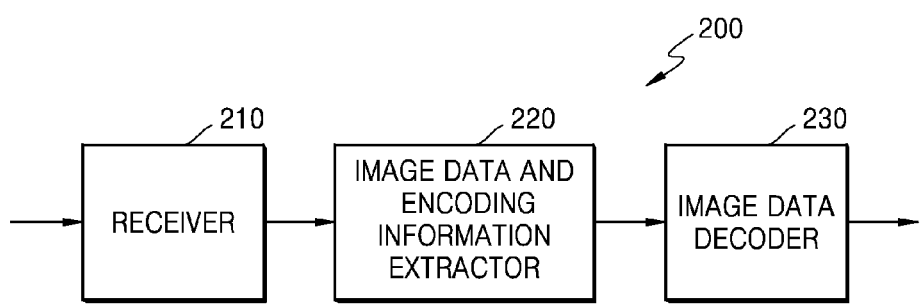
FIG. 9 is a block diagram of a video decoding apparatus based on coding units according to a tree structure, according to various embodiments.

Similarly, in order for the decoder 14 of the video decoding apparatus 70 according to an embodiment to decode a multi-layer video based on coding units having a tree structure, the video stream decoding apparatus 70 may include as many video decoding apparatuses 200 of FIG. 9 as the number of layers of the multi-layer video so as to perform video decoding according to layers with respect to a received base layer video stream and a received enhancement layer video stream, thereby controlling each video decoding apparatus 200 to decode an assigned single-layer video. Also, the video stream decoding apparatus 200 may perform inter-layer compensation by using a decoding result of individual single layer of each video decoding apparatus 200. Accordingly, the decoder 14 of the video decoding apparatus 70 may generate base layer images and enhancement layer images, which are reconstructed according to layers.

FIG. 8 is a block diagram of a video encoding apparatus 100 based on coding units according to a tree structure, according to an embodiment of the present disclosure.

The video encoding apparatus 100 according to an embodiment involving video prediction based on coding units according to a tree structure includes a coding unit determiner 120 and an output unit 130. Hereinafter, for convenience of description, the video encoding apparatus 10 according to an embodiment involving video prediction based on coding units according to a tree structure will be abbreviated to the 'video encoding apparatus 100'.

The coding unit determiner 120 may split a current picture based on a maximum coding unit that is a coding unit having a maximum size for a current picture of an image. If the current picture is larger than the maximum coding unit, image data of the current picture may be split into the at least one maximum coding unit. The maximum coding unit according to an embodiment may be a data unit having a size of 32×32, 64×64, 128×128, 256×256, etc., wherein a shape of the data unit is a square having a width and length in squares of 2.

A coding unit according to an embodiment may be characterized by a maximum size and a depth. The depth denotes the number of times the coding unit is spatially split from the maximum coding unit, and as the depth deepens, deeper coding units according to depths may be split from the maximum coding unit to a minimum coding unit. A depth of the maximum coding unit is an uppermost depth and a depth of the minimum coding unit is a lowermost depth. Since a size of a coding unit corresponding to each depth decreases as the depth of the maximum coding unit deepens, a coding unit corresponding to an upper depth may include a plurality of coding units corresponding to lower depths.

As described above, the image data of the current picture is split into the maximum coding units according to a maximum size of the coding unit, and each of the maximum coding units may include deeper coding units that are split according to depths. Since the maximum coding unit according to an embodiment is split according to depths, the image data of a spatial domain included in the maximum coding unit may be hierarchically classified according to depths.

A maximum depth and a maximum size of a coding unit, which limit the total number of times a height and a width of the maximum coding unit are hierarchically split, may be predetermined.

The coding unit determiner 120 encodes at least one split region obtained by splitting a region of the maximum coding unit according to depths, and determines a depth to output a finally encoded image data according to the at least one split region. In other words, the coding unit determiner 120 determines a coded depth by encoding the image data in the deeper coding units according to depths, according to the maximum coding unit of the current picture, and selecting a depth having the least encoding error. The determined coded depth and the encoded image data according to the determined coded depth are output to the output unit 130.

The image data in the maximum coding unit is encoded based on the deeper coding units corresponding to at least one depth equal to or below the maximum depth, and results of encoding the image data are compared based on each of the deeper coding units. A depth having the least encoding error may be selected after comparing encoding errors of the deeper coding units. At least one coded depth may be selected for each maximum coding unit.

The size of the maximum coding unit is split as a coding unit is hierarchically split according to depths, and as the number of coding units increases. Also, even if coding units correspond to the same depth in one maximum coding unit, it is determined whether to split each of the coding units corresponding to the same depth to a lower depth by measuring an encoding error of the image data of the each coding unit, separately. Accordingly, even when image data is included in one maximum coding unit, the encoding errors may differ according to regions in the one maximum coding unit, and thus the coded depths may differ according to regions in the image data. Thus, one or more coded depths may be determined in one maximum coding unit, and the image data of the maximum coding unit may be divided according to coding units of at least one coded depth.

Accordingly, the coding unit determiner 120 according to an embodiment may determine coding units having a tree structure included in the maximum coding unit. The 'coding units having a tree structure' according to an embodiment include coding units corresponding to a depth determined to be the coded depth, from among all deeper coding units included in the maximum coding unit. A coding unit of a coded depth may be hierarchically determined according to depths in the same region of the maximum coding unit, and may be independently determined in different regions. Similarly, a coded depth in a current region may be independently determined from a coded depth in another region.

A maximum depth according to an embodiment is an index related to the number of splitting times from a maximum coding unit to a minimum coding unit. A first maximum depth according to an embodiment may denote the total number of splitting times from the maximum coding unit to the minimum coding unit. A second maximum depth according to an embodiment may denote the total number of depth levels from the maximum coding unit to the minimum coding unit. For example, when a depth of the maximum coding unit is 0, a depth of a coding unit, in which the maximum coding unit is split once, may be set to 1, and a depth of a coding unit, in which the maximum coding unit is split twice, may be set to 2. Here, if the minimum coding unit is a coding unit in which the maximum coding unit is split four times, depth levels of depths 0, 1, 2, 3, and 4 exist, and thus the first maximum depth may be set to 4, and the second maximum depth may be set to 5.

Prediction encoding and transformation may be performed according to the maximum coding unit. The prediction encoding and the transformation are also performed based on the deeper coding units according to a depth equal to or depths less than the maximum depth, according to the maximum coding unit.

Since the number of deeper coding units increases whenever the maximum coding unit is split according to depths, encoding, including the prediction encoding and the transformation, is performed on all of the deeper coding units generated as the depth deepens. For convenience of description, the prediction encoding and the transformation will now be described based on a coding unit of a current depth, in a maximum coding unit.

The video encoding apparatus 100 according to an embodiment may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 100 may select not only a coding unit for encoding the image data, but also a data unit different from the coding unit so as to perform the prediction encoding on the image data in the coding unit.

In order to perform prediction encoding in the maximum coding unit, the prediction encoding may be performed based on a coding unit corresponding to a coded depth according to an embodiment, i.e., based on a coding unit that is no longer split to coding units corresponding to a lower depth. Hereinafter, the coding unit that is no longer split and becomes a basis unit for prediction encoding will now be referred to as a 'prediction unit'. A partition obtained by splitting the prediction unit may include a prediction unit or a data unit obtained by splitting at least one of a height and a width of the prediction unit. A partition is a data unit where a prediction unit of a coding unit is split, and a prediction unit may be a partition having the same size as a coding unit.

For example, when a coding unit of 2N×2N (where N is a positive integer) is no longer split and becomes a prediction unit of 2N×2N, and a size of a partition may be 2N×2N, 2N×N, N×2N, or N×N. Examples of a partition type according to an embodiment include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one of an intra mode, a inter mode, and a skip mode. For example, the intra mode or the inter mode may be performed on the partition of 2N×2N, 2N×N, N×2N, or N×N. Also, the skip mode may be performed only on the partition of 2N×2N. The encoding is independently performed on one prediction unit in a coding unit, thereby selecting a prediction mode having a least encoding error.

The video encoding apparatus 100 according to an embodiment may also perform the transformation on the image data in a coding unit based not only on the coding unit for encoding the image data, but also based on a data unit that is different from the coding unit. In order to perform the transformation in the coding unit, the transformation may be performed based on a transformation unit having a size smaller than or equal to the coding unit. For example, the transformation unit may include a data unit for an intra mode and a transformation unit for an inter mode.

The transformation unit in the coding unit may be recursively split into smaller sized regions in a manner similar to that in which the coding unit is split according to the tree structure, according to an embodiment. Thus, residual data in the coding unit may be split according to the transformation unit having the tree structure according to transformation depths.

A transformation depth indicating the number of splitting times to reach the transformation unit by splitting the height and width of the coding unit may also be set in the transformation unit according to an embodiment. For example, in a current coding unit of 2N×2N, a transformation depth may be 0 when the size of a transformation unit is 2N×2N, may be 1 when the size of the transformation unit is N×N, and may be 2 when the size of the transformation unit is N/2×N/2. In other words, the transformation unit having the tree structure may be set according to the transformation depths.

Encoding information according to coding units corresponding to a coded depth requires not only information about the coded depth, but also about information related to prediction encoding and transformation. Accordingly, the coding unit determiner 120 not only determines a coded depth having a least encoding error, but also determines a partition type in a prediction unit, a prediction mode according to prediction units, and a size of a transformation unit for transformation.

Coding units according to a tree structure in a maximum coding unit and methods of determining a prediction unit/partition, and a transformation unit, according to embodiments, will be described in detail later with reference to FIGS. 10 through 20.

The coding unit determiner 120 may measure an encoding error of deeper coding units according to depths by using Rate-Distortion Optimization based on Lagrangian multipliers.

The output unit 130 outputs the image data of the maximum coding unit, which is encoded based on the at least one coded depth determined by the coding unit determiner 120, and information about the encoding mode according to the coded depth, in bitstreams.

The encoded image data may be obtained by encoding residual data of an image.

The information about the encoding mode according to coded depth may include information about the coded depth, about the partition type in the prediction unit, the prediction mode, and the size of the transformation unit.

The information about the coded depth may be defined by using split information according to depths, which indicates whether encoding is performed on coding units of a lower depth instead of a current depth. If the current depth of the current coding unit is the coded depth, the current coding unit is encoded, and thus the split information may be defined not to split the current coding unit to a lower depth. Alternatively, if the current depth of the current coding unit is not the coded depth, the encoding is performed on the coding unit of the lower depth, and thus the split information may be defined to split the current coding unit to obtain the coding units of the lower depth.

If the current depth is not the coded depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one maximum coding unit, and information about at least one encoding mode is determined for a coding unit of a coded depth, information about at least one encoding mode may be determined for one maximum coding unit. Also, a coded depth of the image data of the maximum coding unit may be different according to locations since the image data is hierarchically split according to depths, and thus information about the coded depth and the encoding mode may be set for the image data.

Accordingly, the output unit 130 according to an embodiment may assign encoding information about a corresponding coded depth and an encoding mode to at least one of the coding unit, the prediction unit, and a minimum unit included in the maximum coding unit.

The minimum unit according to an embodiment is a square data unit obtained by splitting the minimum coding unit constituting the lowermost depth by 4. Alternatively, the minimum unit according to an embodiment may be a maximum square data unit that may be included in all of the coding units, prediction units, partition units, and transformation units included in the maximum coding unit.

For example, the encoding information output by the output unit 130 may be classified into encoding information according to deeper coding units, and encoding information according to prediction units. The encoding information according to the deeper coding units may include the information about the prediction mode and about the size of the partitions. The encoding information according to the prediction units may include information about an estimated direction of an inter mode, about a reference image index of the inter mode, about a motion vector, about a chroma component of an intra mode, and about an interpolation method of the intra mode.

Information about a maximum size of the coding unit defined according to pictures, slices, or GOPs, and information about a maximum depth may be inserted into a header of a bitstream, a sequence parameter set, or a picture parameter set.

Information about a maximum size of the transformation unit permitted with respect to a current video, and information about a minimum size of the transformation unit may also be output through a header of a bitstream, a sequence parameter set, or a picture parameter set. The output unit 130 may encode and output reference information related to prediction, prediction information, and slice type information.

In the video encoding apparatus 100 according to the simplest embodiment, the deeper coding unit may be a coding unit obtained by dividing a height or width of a coding unit of an upper depth, which is one layer above, by two. In other words, when the size of the coding unit of the current depth is 2N×2N, the size of the coding unit of the lower depth is N×N. Also, the coding unit with the current depth having a size of 2N×2N may include a maximum of 4 of the coding units with the lower depth.

Accordingly, the video encoding apparatus 100 may form the coding units having the tree structure by determining coding units having an optimum shape and an optimum size for each maximum coding unit, based on the size of the maximum coding unit and the maximum depth determined considering characteristics of the current picture. Also, since encoding may be performed on each maximum coding unit by using any one of various prediction modes and transformations, an optimum encoding mode may be determined considering characteristics of the coding unit of various image sizes.

Thus, if an image having a high resolution or a large data amount is encoded in a conventional macroblock, the number of macroblocks per picture excessively increases. Accordingly, the number of pieces of compressed information generated for each macroblock increases, and thus it is difficult to transmit the compressed information and data compression efficiency decreases. However, by using the video encoding apparatus 100 according to an embodiment, image compression efficiency may be increased since a coding unit is adjusted while considering characteristics of an image while increasing a maximum size of a coding unit while considering a size of the image.

The video encoding apparatus 70 described above with reference to FIG. 7A may include as many video encoding apparatuses 100 as the number of layers, in order to encode single-layer images according to layers of a multi-layer video. For example, the base layer encoder may include one video encoding apparatus 100 and the enhancement layer encoder may include as many video encoding apparatuses 100 as the number of layers.

When the video encoding apparatus 100 encodes base layer images, the coding unit determiner 120 may determine, for each maximum coding unit, a prediction unit for inter-prediction according to coding units having a tree structure, and perform inter-prediction according to prediction units.

Even when the video encoding apparatus 100 encodes enhancement layer images, the coding unit determiner 120 may determine, for each maximum coding unit, coding units and prediction units having a tree structure, and perform inter-prediction according to prediction units.

FIG. 9 is a block diagram of the video decoding apparatus 200 based on coding units according to a tree structure, according to various embodiments.

The video decoding apparatus 200 according to an embodiment that involves video prediction based on coding units having a tree structure includes a receiver 210, an image data and encoding information extractor 220, and an image data decoder 230. For convenience of description, the video decoding apparatus 200 according to an embodiment that involves video prediction based on coding units having a tree structure will be abbreviated to the 'video decoding apparatus 200'.

Definitions of various terms, such as a coding unit, a depth, a prediction unit, a transformation unit, and information about various encoding modes, for decoding operations of the video decoding apparatus 200 according to an embodiment are identical to those described with reference to FIG. 8 and the video encoding apparatus 100.

The receiver 210 receives and parses a bitstream of an encoded video. The image data and encoding information extractor 220 extracts encoded image data for each coding unit from the parsed bitstream, wherein the coding units have a tree structure according to each maximum coding unit, and outputs the extracted image data to the image data decoder 230. The image data and encoding information extractor 220 may extract information about a maximum size of a coding unit of a current picture, from a header about the current picture, a sequence parameter set, or a picture parameter set.

Also, the image data and encoding information extractor 220 extracts information about a coded depth and an encoding mode for the coding units having a tree structure according to each maximum coding unit, from the parsed bitstream. The extracted information about the coded depth and the encoding mode is output to the image data decoder 230. In other words, the image data in a bit stream is split into the maximum coding unit so that the image data decoder 230 decodes the image data for each maximum coding unit.

The information about the coded depth and the encoding mode according to the maximum coding unit may be set for information about at least one coding unit corresponding to the coded depth, and information about an encoding mode may include information about a partition type of a corresponding coding unit corresponding to the coded depth, about a prediction mode, and a size of a transformation unit. Also, splitting information according to depths may be extracted as the information about the coded depth.

The information about the coded depth and the encoding mode according to each maximum coding unit extracted by the image data and encoding information extractor 220 is information about a coded depth and an encoding mode determined to generate a minimum encoding error when an encoder, such as the video encoding apparatus 100 according to an embodiment, repeatedly performs encoding for each deeper coding unit according to depths according to each maximum coding unit. Accordingly, the video decoding apparatus 200 may reconstruct an image by decoding the image data according to a coded depth and an encoding mode that generates the minimum encoding error.

Since encoding information according to an embodiment about the coded depth and the encoding mode may be assigned to a predetermined data unit from among a corresponding coding unit, a prediction unit, and a minimum unit, the image data and encoding information extractor 220 may extract the information about the coded depth and the encoding mode according to the predetermined data units. If information about a coded depth and encoding mode of a corresponding maximum coding unit is recorded according to predetermined data units, the predetermined data units to which the same information about the coded depth and the encoding mode is assigned may be inferred to be the data units included in the same maximum coding unit.

The image data decoder 230 may reconstruct the current picture by decoding the image data in each maximum coding unit based on the information about the coded depth and the encoding mode according to the maximum coding units. In other words, the image data decoder 230 may decode the encoded image data based on the extracted information about the partition type, the prediction mode, and the transformation unit for each coding unit from among the coding units having the tree structure included in each maximum coding unit. A decoding process may include a prediction including intra prediction and motion compensation, and an inverse transformation.

The image data decoder 230 may perform intra prediction or motion compensation according to a partition and a prediction mode of each coding unit, based on the information about the partition type and the prediction mode of the prediction unit of the coding unit according to coded depths.

In addition, the image data decoder 230 may read information about a transformation unit according to a tree structure for each coding unit so as to perform inverse transformation based on transformation units for each coding unit, for inverse transformation for each maximum coding unit. Via the inverse transformation, a pixel value of a spatial region of the coding unit may be reconstructed.

The image data decoder 230 may determine a coded depth of a current maximum coding unit by using split information according to depths. If the split information indicates that image data is no longer split in the current depth, the current depth is a coded depth. Accordingly, the image data decoder 230 may decode encoded data in the current maximum coding unit by using the information about the partition type of the prediction unit, the prediction mode, and the size of the transformation unit for each coding unit corresponding to the coded depth.

In other words, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 230 in the same encoding mode. As such, the current coding unit may be decoded by obtaining the information about the encoding mode for each coding unit.

The decoder 14 of the video decoding apparatus 70 described above with reference to FIG. 1B may include as many image data decoders 230 as the number of layers, so as to generate a reference image for inter prediction according to layers of a multi-layer video.

Also, the decoder 14 of the video decoding apparatus 70 described above with reference to FIG. 1B may include the number of video decoding apparatuses 200 as much as the number of views, so as to reconstruct base layer images and enhancement layer images by decoding a received base layer image stream and a received enhancement layer image stream.

When the base layer image stream is received, the image data decoder 230 of the video decoding apparatus 200 may split samples of base layer images extracted from the base layer image stream by the image data and encoding information extractor 220 into coding units having a tree structure. The image data decoder 230 may reconstruct the base layer images by performing motion compensation according to prediction units for inter prediction, on the coding units having the tree structure obtained by splitting the samples of the base layer images.

When the enhancement layer image stream is received, the image data decoder 230 of the video decoding apparatus 200 may split samples of enhancement layer images extracted from the enhancement layer image stream by the image data and encoding information extractor 220 into coding units having a tree structure. The image data decoder 230 may reconstruct the enhancement layer images by performing motion compensation according to prediction units for inter prediction, on the coding units obtained by splitting the samples of the enhancement layer images.

Thus, the video decoding apparatus 200 may obtain information about at least one coding unit that generates the minimum encoding error when encoding is recursively performed for each maximum coding unit, and may use the information to decode the current picture. In other words, the coding units having the tree structure determined to be the optimum coding units in each maximum coding unit may be decoded.

Accordingly, even if image data has high resolution and a large amount of data, the image data may be efficiently decoded and reconstructed by using a size of a coding unit and an encoding mode, which are adaptively determined according to characteristics of the image data, by using information about an optimum encoding mode received from an encoder.

Figure 10:
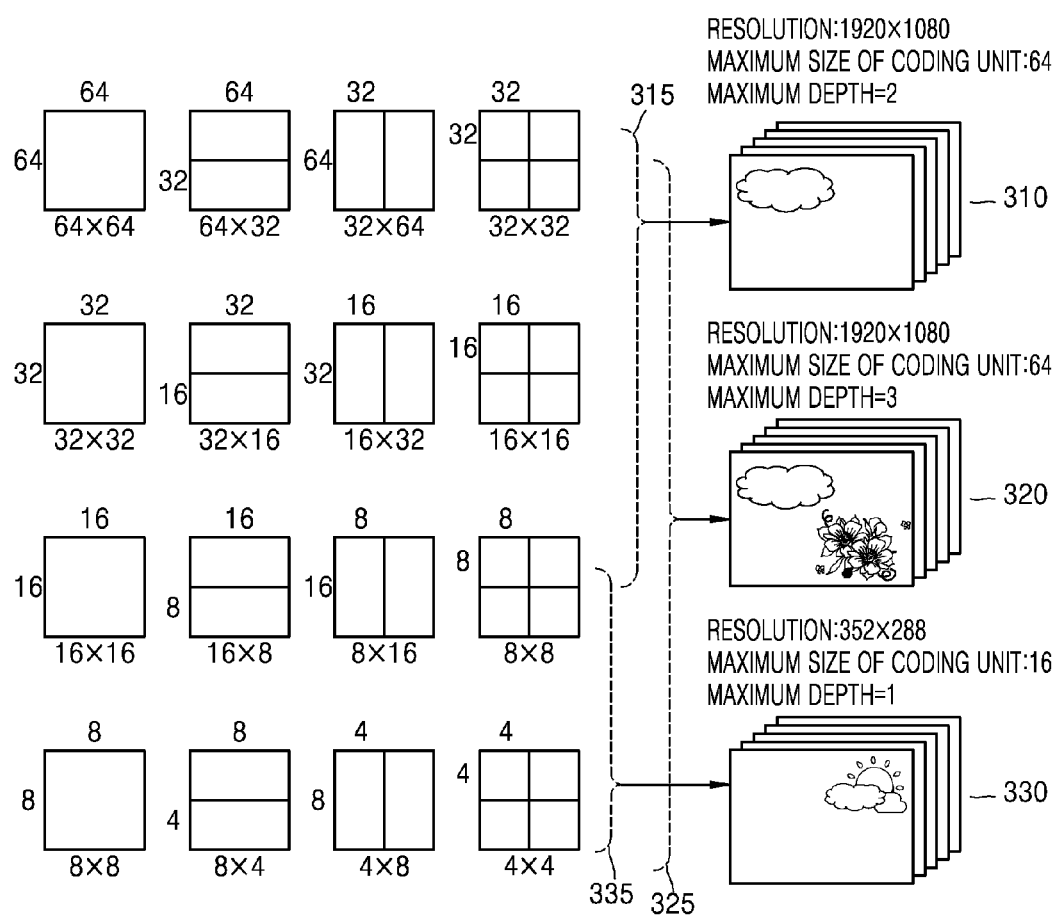
FIG. 10 is a diagram for describing a concept of coding units according to various embodiments.

FIG. 10 is a diagram for describing a concept of coding units according to various embodiments.

A size of a coding unit may be expressed by width x height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 10 denotes a total number of splits from a maximum coding unit to a minimum decoding unit.

If a resolution is high or a data amount is large, a maximum size of a coding unit may be large so as to not only increase encoding efficiency but also to accurately reflect characteristics of an image. Accordingly, the maximum size of the coding unit of the video data 310 and 320 having a higher resolution than the video data 330 may be 64.

Since the maximum depth of the video data 310 is 2, coding units 315 of the vide data 310 may include a maximum coding unit having a long axis size of 64, and coding units having long axis sizes of 32 and 16 since depths are deepened to two layers by splitting the maximum coding unit twice. Since the maximum depth of the video data 330 is 1, coding units 335 of the video data 330 may include a maximum coding unit having a long axis size of 16, and coding units having a long axis size of 8 since depths are deepened to one layer by splitting the maximum coding unit once.

Since the maximum depth of the video data 320 is 3, coding units 325 of the video data 320 may include a maximum coding unit having a long axis size of 64, and coding units having long axis sizes of 32, 16, and 8 since the depths are deepened to 3 layers by splitting the maximum coding unit three times. As a depth deepens, detailed information may be precisely expressed.

Figure 11:
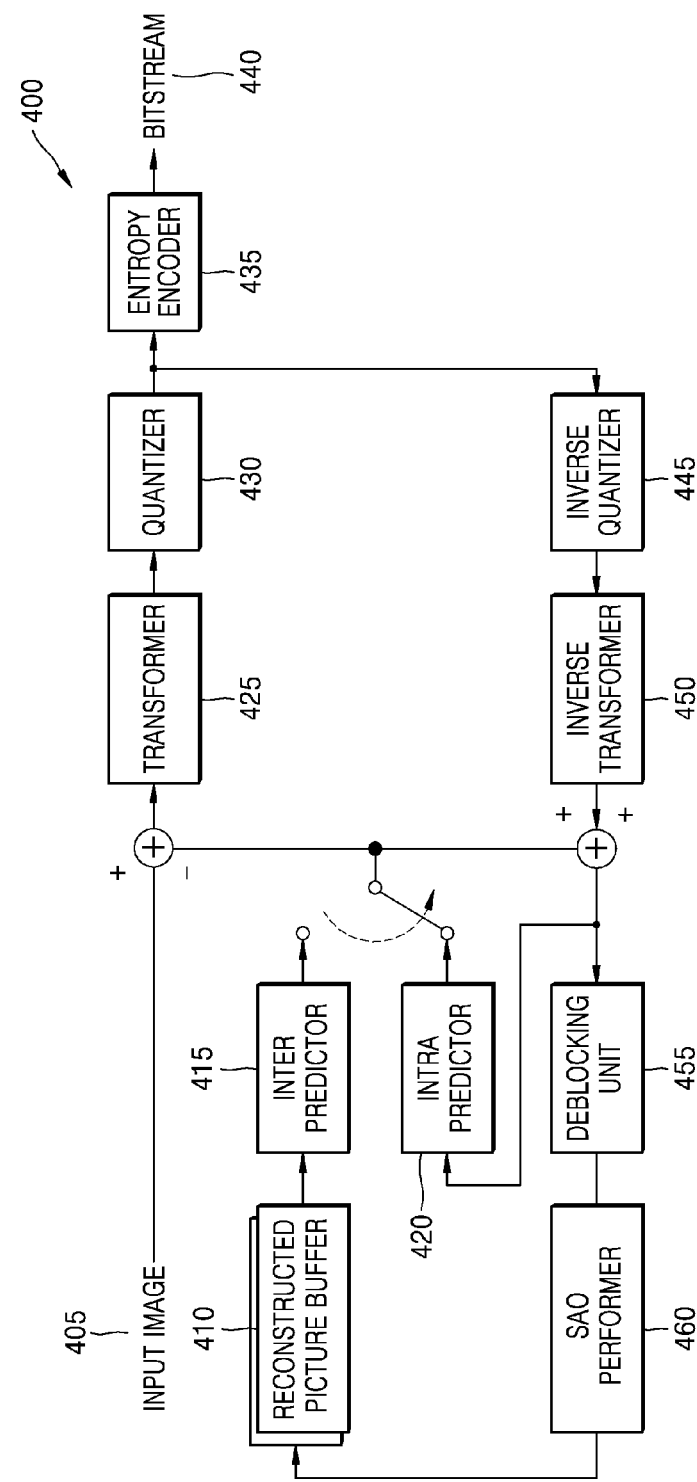
FIG. 11 is a block diagram of an image encoder based on coding units, according to various embodiments.

FIG. 11 is a block diagram of an image encoder 400 based on coding units, according to an embodiment.

The image encoder 400 according to an embodiment performs operations necessary for encoding image data in the picture decoder 120 of the video encoding apparatus 100. In other words, an intra predictor 420 performs intra prediction on coding units in an intra mode according to prediction units, from among a current frame 405, and an inter predictor 415 performs inter prediction on coding units in an inter mode by using a current image 405 and a reference image obtained from a reconstructed picture buffer 410 according to prediction units. The current image 405 may be split into maximum coding units and then the maximum coding units may be sequentially encoded. In this regard, the maximum coding units that are to be split into coding units having a tree structure may be encoded.

Residue data is generated by removing prediction data regarding coding units of each mode that is output from the intra predictor 420 or the inter predictor 415 from data regarding encoded coding units of the current image 405, and is output as a quantized transformation coefficient according to transformation units through a transformer 425 and a quantizer 430. The quantized transformation coefficient is reconstructed as the residue data in a space domain through an inverse quantizer 445 and an inverse transformer 450. The reconstructed residue data in the space domain is added to prediction data for coding units of each mode that is output from the intra predictor 420 or the inter predictor and thus is reconstructed as data in a space domain for coding units of the current image 405. The reconstructed data in the space domain is generated as reconstructed images through a de-blocking unit 455 and an SAO performer 460 and the reconstructed images are stored in the reconstructed picture buffer 410. The reconstructed images stored in the reconstructed picture buffer 410 may be used as reference images for inter prediction of another image. The transformation coefficient quantized by the transformer 425 and the quantizer 430 may be output as a bitstream 440 through an entropy encoder 435.

In order for the image encoder 400 according to an embodiment to be applied in the video encoding apparatus 100, all elements of the image encoder 400, i.e., the inter predictor 415, the intra predictor 420, the transformer 425, the quantizer 430, the entropy encoder 435, the inverse quantizer 445, the inverse transformer 450, the de-blocking unit 455, and the SAO performer 460, perform operations based on each coding unit among coding units having a tree structure according to each maximum coding unit.

Specifically, the intra predictor 420 and the inter predictor 415 may determine a partition mode and a prediction mode of each coding unit among the coding units having a tree structure in consideration of a maximum size and a maximum depth of a current maximum coding unit, and the transformer 425 may determine whether to split a transformation unit having a quad tree structure in each coding unit among the coding units having a tree structure.

Figure 12:
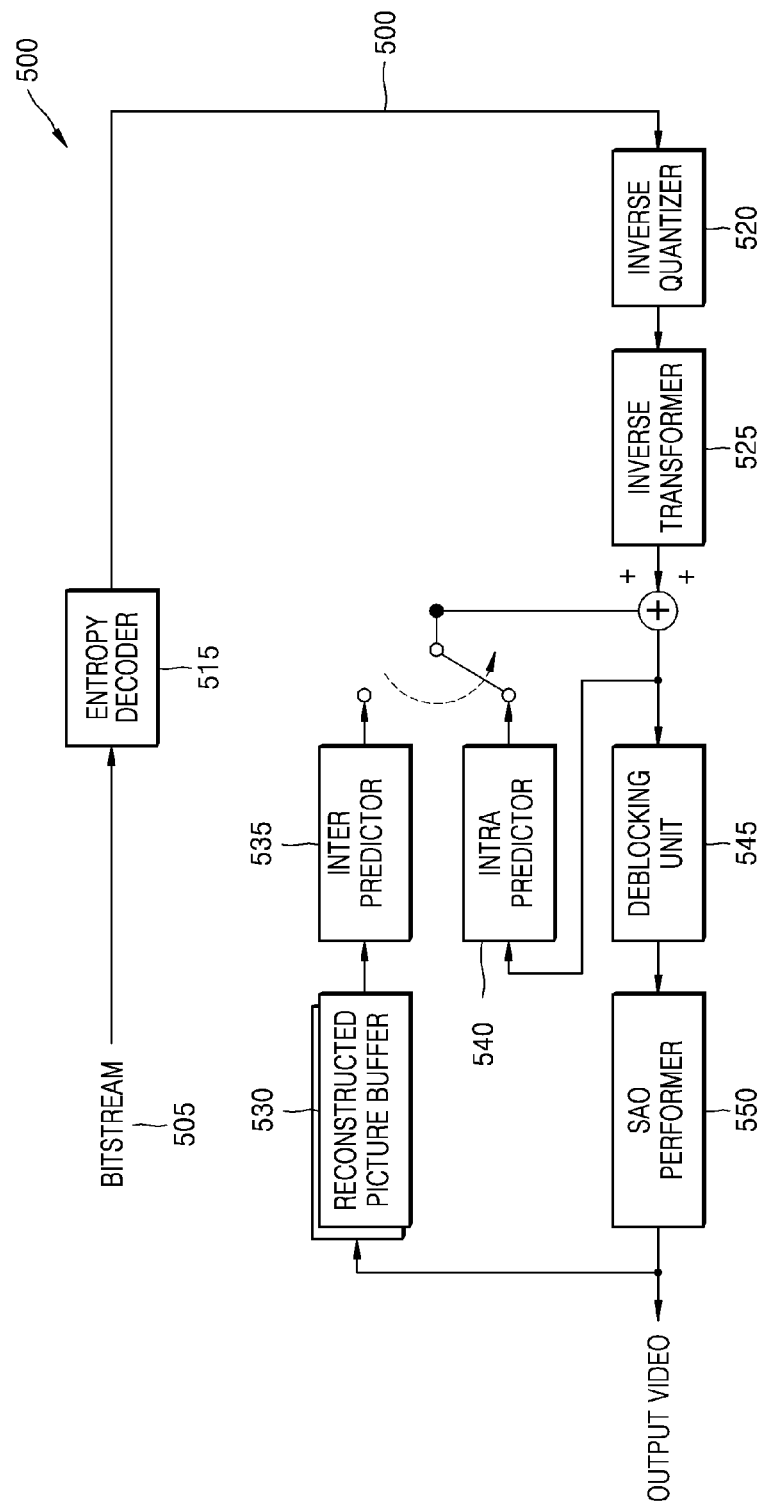
FIG. 12 is a block diagram of an image decoder based on coding units, according to various embodiments.

FIG. 12 is a block diagram of an image decoder 500 based on coding units, according to an embodiment.

An entropy decoder 515 parses encoded image data to be decoded and encoding information required for decoding from a bitstream 505. The encoded image data is a quantized transformation coefficient from which residue data is reconstructed by an inverse quantizer 520 and an inverse transformer 525.

An intra predictor 540 performs intra prediction on coding units in an intra mode according to each prediction unit. An inter predictor 535 performs inter prediction on coding units in an inter mode from among the current image for each prediction unit by using a reference image obtained from a reconstructed picture buffer 530.

Prediction data and residue data regarding coding units of each mode, which passed through the intra predictor 540 and the inter predictor 535, are summed, and thus data in a space domain regarding coding units of the current image 405 may be reconstructed, and the reconstructed data in the space domain may be output as a reconstructed image 560 through a de-blocking unit 545 and an SAO performer 550. Reconstructed images stored in the reconstructed picture buffer 530 may be output as reference images.

In order to decode the image data in the image data decoder 230 of the video decoding apparatus 200, operations after the entropy decoder 515 of the image decoder 500 according to an embodiment may be performed.

In order for the image decoder 500 to be applied in the video decoding apparatus 200 according to an embodiment, all elements of the image decoder 500, i.e., the entropy decoder 515, the inverse quantizer 520, the inverse transformer 525, the inter predictor 535, the de-blocking unit 545, and the SAO performer 550 may perform operations based on coding units having a tree structure for each maximum coding unit.

In particular, the intra predictor 540 and the inter predictor 535 may determine a partition and a prediction mode for each of the coding units having a tree structure, and the inverse transformer 525 may determine whether to split a transformation unit having a quad tree structure for each of the coding units.

The encoding operation of FIG. 11 and the decoding operation of FIG. 12 respectively describe video stream encoding and decoding operations in a single layer. Thus, if the encoder 72 of FIG. 1A encodes video streams of two or more layers, the image encoder 400 may be included for each layer. Similarly, if the decoder 14 of FIG. 1B decodes video streams of two or more layers, the image decoder 500 may be included for each layer.

Figure 13:
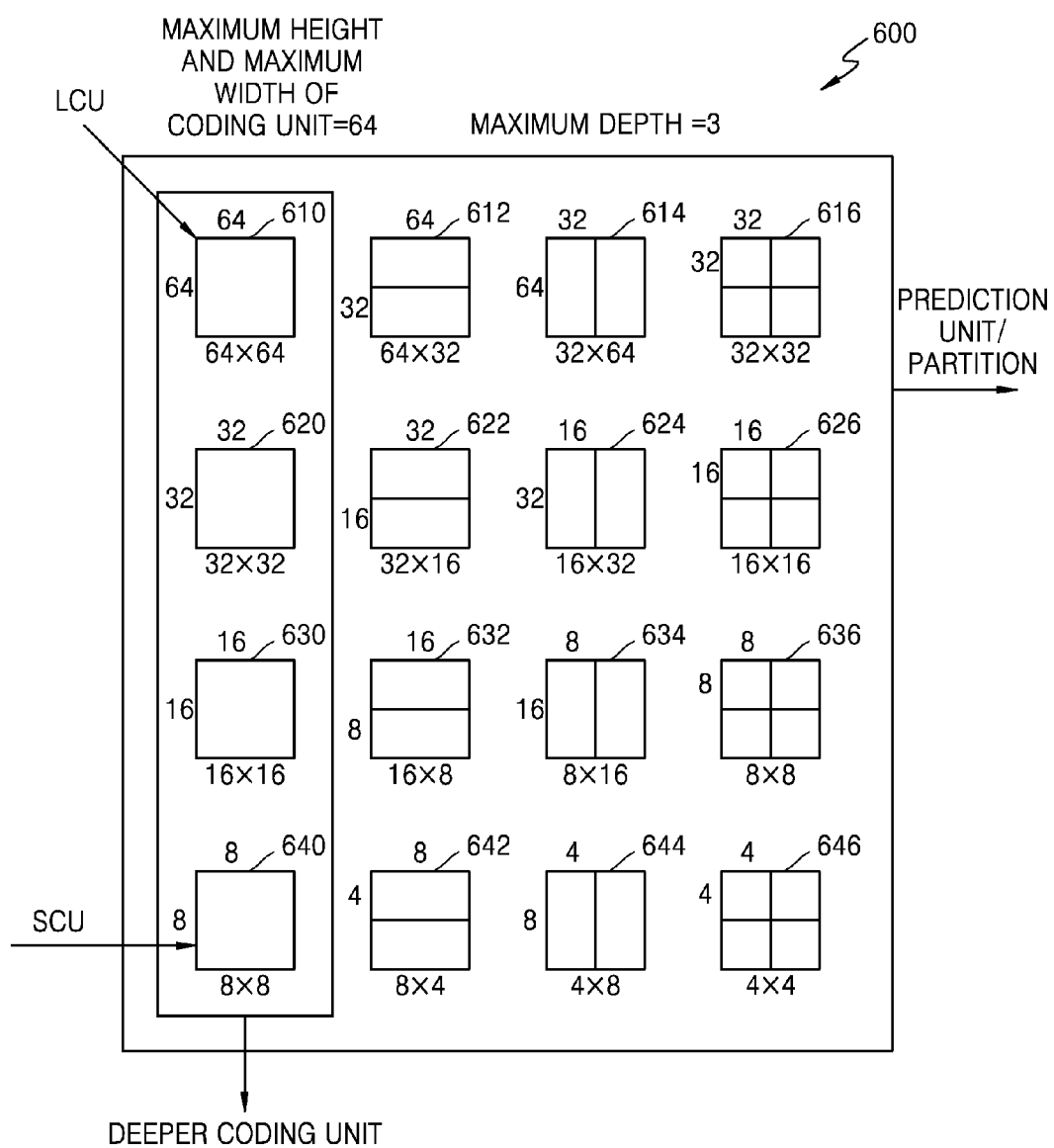
FIG. 13 is a diagram illustrating deeper coding units according to depths, and partitions, according to various embodiments.

FIG. 13 is a diagram illustrating deeper coding units according to depths, and partitions, according to various embodiments.

The video encoding apparatus 100 according to an embodiment and the video decoding apparatus 200 according to an embodiment use hierarchical coding units so as to consider characteristics of an image. A maximum height, a maximum width, and a maximum depth of coding units may be adaptively determined according to the characteristics of the image, or may be differently set by a user. Sizes of deeper coding units according to depths may be determined according to the predetermined maximum size of the coding unit.

In a hierarchical structure 600 of coding units according to an embodiment, the maximum height and the maximum width of the coding units are each 64, and the maximum depth is 3. In this case, the maximum depth refers to a total number of times the coding unit is split from the maximum coding unit to the minimum coding unit. Since a depth deepens along a vertical axis of the hierarchical structure 600 of coding units according to an embodiment, a height and a width of the deeper coding unit are each split. Also, a prediction unit and partitions, which are bases for prediction encoding of each deeper coding unit, are shown along a horizontal axis of the hierarchical structure 600.

In other words, a coding unit 610 is a maximum coding unit in the hierarchical structure 600, wherein a depth is 0 and a size, i.e., a height by width, is 64×64. The depth deepens along the vertical axis, and a coding unit 620 having a size of 32×32 and a depth of 1, a coding unit 630 having a size of 16×16 and a depth of 2, and a coding unit 640 having a size of 8×8 and a depth of 3. The coding unit 640 having a size of 8×8 and a depth of 3 is a minimum coding unit.

The prediction unit and the partitions of a coding unit are arranged along the horizontal axis according to each depth. In other words, if the coding unit 610 having a size of 64×64 and a depth of 0 is a prediction unit, the prediction unit may be split into partitions include in the encoding unit 610, i.e. a partition 610 having a size of 64×64, partitions 612 having the size of 64×32, partitions 614 having the size of 32×64, or partitions 616 having the size of 32×32.

Similarly, a prediction unit of the coding unit 620 having the size of 32×32 and the depth of 1 may be split into partitions included in the coding unit 620, i.e. a partition 620 having a size of 32×32, partitions 622 having a size of 32×16, partitions 624 having a size of 16×32, and partitions 626 having a size of 16×16.

Similarly, a prediction unit of the coding unit 630 having the size of 16×16 and the depth of 2 may be split into partitions included in the coding unit 630, i.e. a partition having a size of 16×16 included in the coding unit 630, partitions 632 having a size of 16×8, partitions 634 having a size of 8×16, and partitions 636 having a size of 8×8.

Similarly, a prediction unit of the coding unit 640 having the size of 8×8 and the depth of 3 may be split into partitions included in the coding unit 640, i.e. a partition having a size of 8×8 included in the coding unit 640, partitions 642 having a size of 8×4, partitions 644 having a size of 4×8, and partitions 646 having a size of 4×4.

In order to determine the at least one coded depth of the coding units constituting the maximum coding unit 610, the coding unit determiner 120 of the video encoding apparatus 100 according to an embodiment performs encoding for coding units corresponding to each depth included in the maximum coding unit 610.

A number of deeper coding units according to depths including data in the same range and the same size increases as the depth deepens. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for a current depth from among the depths, a least encoding error may be selected for the current depth by performing encoding for each prediction unit in the coding units corresponding to the current depth, along the horizontal axis of the hierarchical structure 600. Alternatively, the minimum encoding error may be searched for by comparing the least encoding errors according to depths, by performing encoding for each depth as the depth deepens along the vertical axis of the hierarchical structure 600. A depth and a partition having the minimum encoding error in the coding unit 610 may be selected as the coded depth and a partition type of the coding unit 610.

Figure 14:
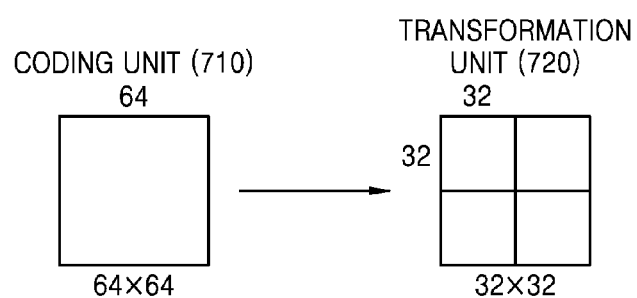
FIG. 14 is a diagram for describing a relationship between a coding unit and transformation units, according to various embodiments.

FIG. 14 is a diagram for describing a relationship between a coding unit and transformation units, according to various embodiments.

The video encoding apparatus 100 according to an embodiment or the video decoding apparatus 200 according to an embodiment encodes or decodes an image according to coding units having sizes smaller than or equal to a maximum coding unit for each maximum coding unit. Sizes of transformation units for transformation during encoding may be selected based on data units that are not larger than a corresponding coding unit.

For example, in the video encoding apparatus 100 according to an embodiment or the video decoding apparatus 200 according to an embodiment, if a size of a coding unit 710 is 64×64, transformation may be performed by using a transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the least coding error may be selected.

Figure 15:
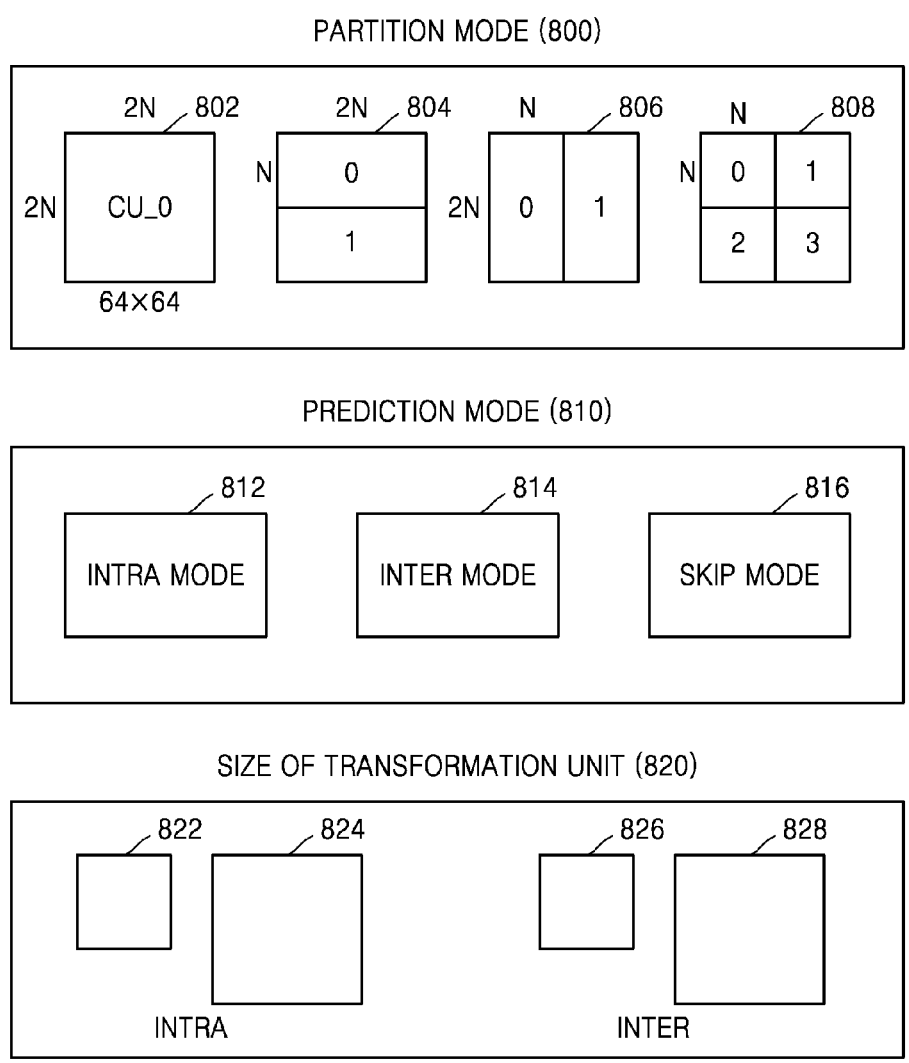
FIG. 15 is a diagram for describing encoding information of coding units corresponding to a coded depth, according to various embodiments.

FIG. 15 is a diagram for describing encoding information of coding units corresponding to a coded depth, according to various embodiments.

The output unit 130 of the video encoding apparatus 100 according to an embodiment may encode and transmit information 800 about a partition type, information 810 about a prediction mode, and information 820 about a size of a transformation unit for each coding unit corresponding to a coded depth, as information about an encoding mode.

The information 800 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. Here, the information 800 about a partition type is set to indicate one of the partition 804 having a size of 2N×N, the partition 806 having a size of N×2N, and the partition 808 having a size of N×N.

The information 810 indicates a prediction mode of each partition. For example, the information 810 may indicate a mode of prediction encoding performed on a partition indicated by the information 800, i.e., an intra mode 812, an inter mode 814, or a skip mode 816.

The information 820 indicates a transformation unit to be based on when transformation is performed on a current coding unit. For example, the transformation unit may be a first intra transformation unit 822, a second intra transformation unit 824, a first inter transformation unit 826, or a second inter transformation unit 828.

The image data and encoding information extractor 220 of the video decoding apparatus 200 according to an embodiment may extract and use the information 800, 810, and 820 for decoding, according to each deeper coding unit.

Figure 16:
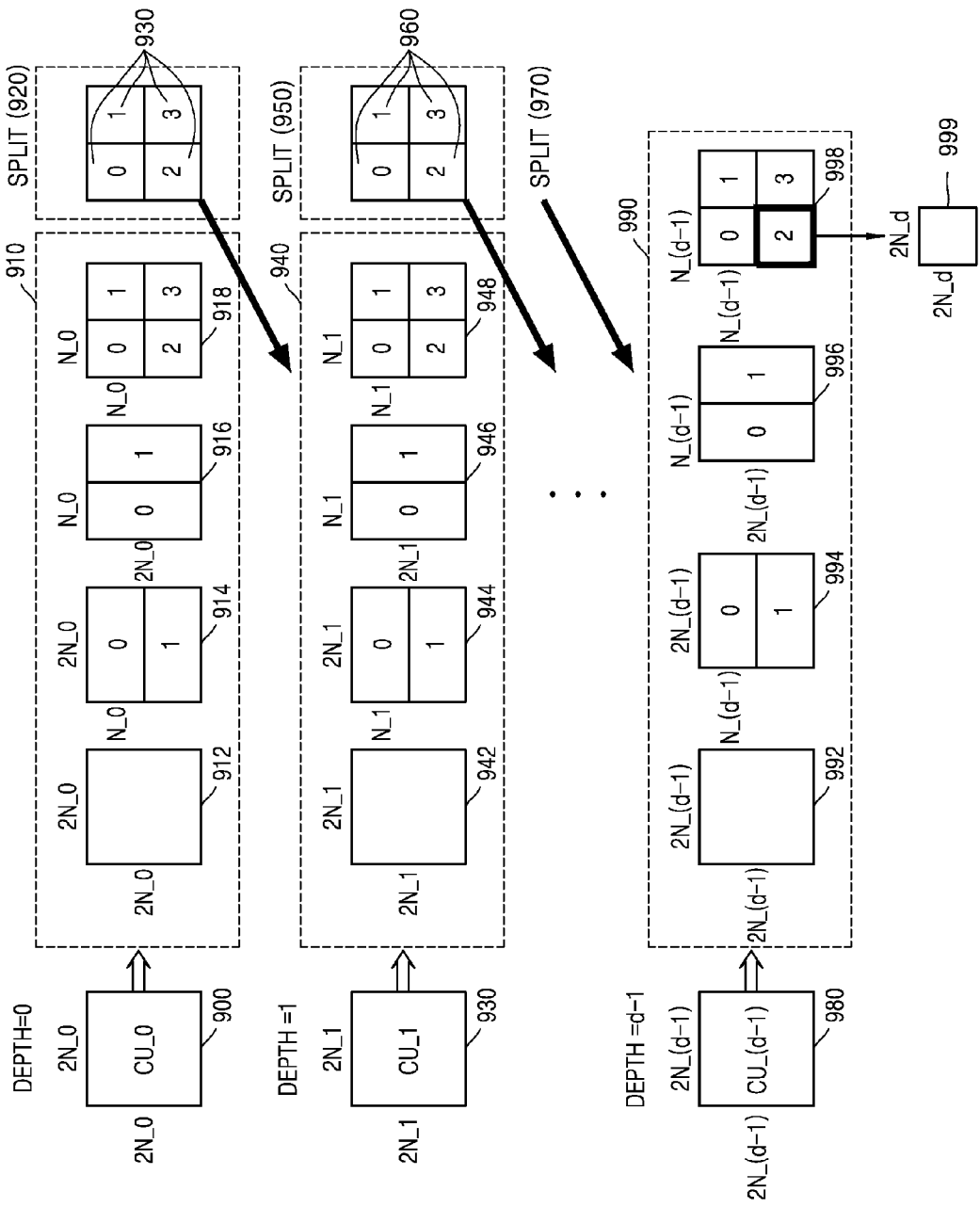
FIG. 16 is a diagram of deeper coding units according to depths, according to various embodiments.

FIG. 16 is a diagram of deeper coding units according to depths, according to various embodiments.

Split information may be used to indicate a change of a depth. The spilt information indicates whether a coding unit of a current depth is split into coding units of a lower depth.

A prediction unit 910 for prediction encoding a coding unit 900 having a depth of 0 and a size of 2N_0×2N_0 may include partitions of a partition type 912 having a size of 2N_0×2N_0, a partition type 914 having a size of 2N_0×N_0, a partition type 916 having a size of N_0×2N_0, and a partition type 918 having a size of N_0×N_0. FIG. 9 only illustrates the partition types 912 through 918 which are obtained by symmetrically splitting the prediction unit 910, but a partition type is not limited thereto, and the partitions of the prediction unit 910 may include asymmetrical partitions, partitions having a predetermined shape, and partitions having a geometrical shape.

Prediction encoding is repeatedly performed on one partition having a size of 2N_0×2N_0, two partitions having a size of 2N_0×N_0, two partitions having a size of N_0×2N_0, and four partitions having a size of N_0×N_0, according to each partition type. The prediction encoding in an intra mode and an inter mode may be performed on the partitions having the sizes of 2N_0×2N_0, N_0×2N_0, 2N_0×N_0, and N_0×N_0. The prediction encoding in a skip mode is performed only on the partition having the size of 2N_0×2N_0.

If an encoding error is smallest in one of the partition types 912 through 916, the prediction unit 910 may not be split into a lower depth.

If the encoding error is the smallest in the partition type 918, a depth is changed from 0 to 1 to split the partition type 918 in operation 920, and encoding is repeatedly performed on coding units 930 having a depth of 2 and a size of N_0×N_0 to search for a minimum encoding error.

A prediction unit 940 for prediction encoding the coding unit 930 having a depth of 1 and a size of 2N_1×2N_1 (=N_0×N_0) may include partitions of a partition type 942 having a size of 2N_1×2N_1, a partition type 944 having a size of 2N_1×N_1, a partition type 946 having a size of N_1×2N_1, and a partition type 948 having a size of N_1×N_1.

If an encoding error is the smallest in the partition type 948, a depth is changed from 1 to 2 to split the partition type 948 in operation 950, and encoding is repeatedly performed on coding units 960, which have a depth of 2 and a size of N_2×N_2 to search for a minimum encoding error.

When a maximum depth is d, split operation according to each depth may be performed up to when a depth becomes d−1, and split information may be encoded as up to when a depth is one of 0 to d−2. In other words, when encoding is performed up to when the depth is d−1 after a coding unit corresponding to a depth of d−2 is split in operation 970, a prediction unit 990 for prediction encoding a coding unit 980 having a depth of d−1 and a size of 2N_(d−1)×2N_(d−1) may include partitions of a partition type 992 having a size of 2N_(d−1)×2N_(d−1), a partition type 994 having a size of 2N_(d−1)×N_(d−1), a partition type 996 having a size of N_(d−1)×2N_(d−1), and a partition type 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition types 992 through 998 to search for a partition type having a minimum encoding error.

Even when the partition type 998 has the minimum encoding error, since a maximum depth is d, a coding unit CU_(d−1) having a depth of d−1 is no longer split to a lower depth, and a coded depth for the coding units constituting a current maximum coding unit 900 is determined to be d−1 and a partition type of the current maximum coding unit 900 may be determined to be N_(d−1)×N_(d−1). Also, since the maximum depth is d, split information for a coding unit 952 having a depth of d−1 is not set.

A data unit 999 may be a 'minimum unit' for the current maximum coding unit. A minimum unit according to an embodiment may be a square data unit obtained by splitting a minimum coding unit having a lowermost coded depth by 4. By performing the encoding repeatedly, the video encoding apparatus 100 according to an embodiment may select a depth having the least encoding error by comparing encoding errors according to depths of the coding unit 900 to determine a coded depth, and set a corresponding partition type and a prediction mode as an encoding mode of the coded depth.

As such, the minimum encoding errors according to depths are compared in all of the depths of 1 through d, and a depth having the least encoding error may be determined as a coded depth. The coded depth, the partition type of the prediction unit, and the prediction mode may be encoded and transmitted as information about an encoding mode. Also, since a coding unit is split from a depth of 0 to a coded depth, only split information of the coded depth is set to 0, and split information of depths excluding the coded depth is set to 1.

The image data and encoding information extractor 220 of the video decoding apparatus 200 according to an embodiment may extract and use the information about the coded depth and the prediction unit of the coding unit 900 to decode the partition 912. The video decoding apparatus 200 according to an embodiment may determine a depth, in which split information is 0, as a coded depth by using split information according to depths, and use information about an encoding mode of the corresponding depth for decoding.

1052 are 2, depths of coding units 1020, 1022, 1024, 1026, 1030, 1032, and 1048 are 3, and depths of coding units 1040, 1042, 1044, and 1046 are 4.

In the prediction units 1060, some encoding units 1014, 1016, 1022, 1032, 1048, 1050, 1052, and 1054 are obtained by splitting the coding units in the encoding units 1010. In other words, partition types in the coding units 1014, 1022, 1050, and 1054 have a size of 2N×N, partition types in the coding units 1016, 1048, and 1052 have a size of N×2N, and a partition type of the coding unit 1032 has a size of N×N. Prediction units and partitions of the coding units 1010 are smaller than or equal to each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, and 1052 in the transformation units 1070 are different from those in the prediction units 1060 in terms of sizes and shapes. In other words, the video encoding and decoding apparatuses 100 and 200 according to an embodiment may perform intra prediction, motion estimation, motion compensation, transformation, and inverse transformation individually on a data unit in the same coding unit.

Accordingly, encoding is recursively performed on each of coding units having a hierarchical structure in each region of a maximum coding unit to determine an optimum coding unit, and thus coding units having a recursive tree structure may be obtained. Encoding information may include split information about a coding unit, information about a partition type, information about a prediction mode, and information about a size of a transformation unit. Table 1 shows the encoding information that may be set by the video encoding and decoding apparatuses 100 and 200 according to an embodiment.

TABLE 1

| | Split Information 0 (Encoding on Coding Unit having Size of 2N × 2N and Current Depth of d) | | | | | Split Information 1 |
|---|---|---|---|---|---|---|
| | | Partition Type | | Size of Transformation Unit | | |
| Prediction Mode | Symmetrical Partition Type | Asymmetrical Partition Type | Split Information 0 of Transformation Unit | Split Information 1 of Transformation Unit | | |
| Intra Inter Skip (Only 2N × 2N) | 2N × 2N 2N × N N × 2N N × N | 2N × nU 2N × nD nL × 2N nR × 2N | 2N × 2N | N × N (Symmetrical Type) N/2 × N/2 (Asymmetrical Type) | Repeatedly Encode Coding Units having Lower Depth of d + 1 | |

Figure 17:
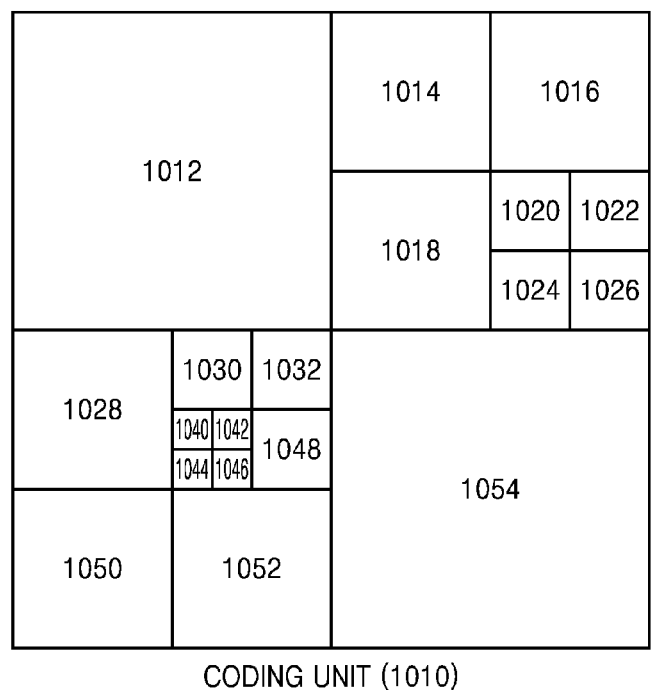
FIGS. 17 through 19 are diagrams for describing a relationship between coding units, prediction units, and transformation units, according to various embodiments.
Figure 18:
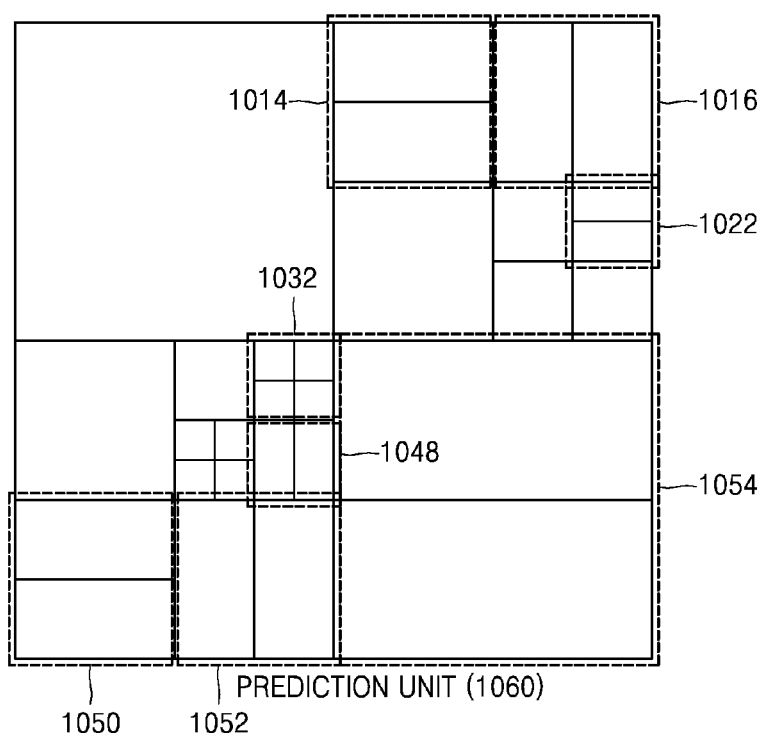
Figure 19:
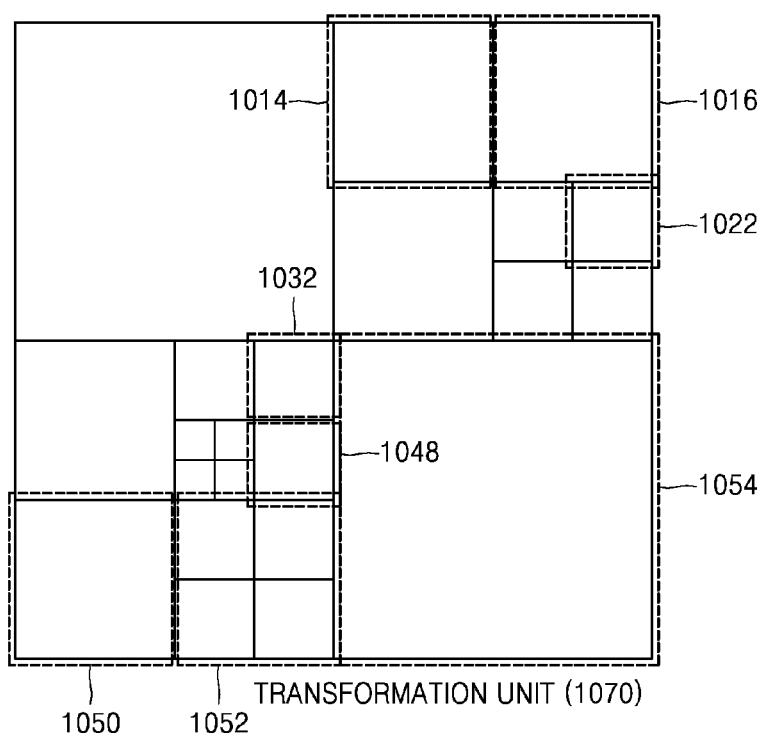

FIGS. 17 through 19 are diagrams for describing a relationship between coding units, prediction units, and transformation units, according to various embodiments.

Coding units 1010 are coding units having a tree structure, corresponding to coded depths determined by the video encoding apparatus 100 according to an embodiment, in a maximum coding unit. Prediction units 1060 are partitions of prediction units of each of the coding units 1010, and transformation units 1070 are transformation units of each of the coding units 1010.

When a depth of a maximum coding unit is 0 in the coding units 1010, depths of coding units 1012 and 1054 are 1, depths of coding units 1014, 1016, 1018, 1028, 1050, and The output unit 130 of the video encoding apparatus 100 according to an embodiment may output the encoding information about the coding units having a tree structure, and the image data and encoding information extractor 220 of the video decoding apparatus 200 according to an embodiment may extract the encoding information about the coding units having a tree structure from a received bitstream.

Split information indicates whether a current coding unit is split into coding units of a lower depth. If split information of a current depth d is 0, a depth, in which a current coding unit is no longer split into a lower depth, is a coded depth, and thus information about a partition type, prediction mode, and a size of a transformation unit may be defined for the coded depth. If the current coding unit is further split according to the split information, encoding is independently performed on four split coding units of a lower depth.

A prediction mode may be one of an intra mode, an inter mode, and a skip mode. The intra mode and the inter mode may be defined in all partition types, and the skip mode is defined only in a partition type having a size of 2N×2N.

The information about the partition type may indicate symmetrical partition types having sizes of 2N×2N, 2N×N, N×2N, and N×N, which are obtained by symmetrically splitting a height or a width of a prediction unit, and asymmetrical partition types having sizes of 2N×nU, 2N×nD, nL×2N, and nR×2N, which are obtained by asymmetrically splitting the height or width of the prediction unit. The asymmetrical partition types having the sizes of 2N×nU and 2N×nD may be respectively obtained by splitting the height of the prediction unit in 1:3 and 3:1, and the asymmetrical partition types having the sizes of nL×2N and nR×2N may be respectively obtained by splitting the width of the prediction unit in 1:3 and 3:1

The size of the transformation unit may be set to be two types in the intra mode and two types in the inter mode. In other words, if split information of the transformation unit is 0, the size of the transformation unit may be 2N×2N, which is the size of the current coding unit. If split information of the transformation unit is 1, the transformation units may be obtained by splitting the current coding unit. Also, if a partition type of the current coding unit having the size of 2N×2N is a symmetrical partition type, a size of a transformation unit may be N×N, and if the partition type of the current coding unit is an asymmetrical partition type, the size of the transformation unit may be N/2×N/2.

The encoding information about coding units having a tree structure, according to an embodiment, may include at least one of a coding unit corresponding to a coded depth, a prediction unit, and a minimum unit. The coding unit corresponding to the coded depth may include at least one of a prediction unit and a minimum unit containing the same encoding information.

Accordingly, it is determined whether adjacent data units are included in the same coding unit corresponding to the coded depth by comparing encoding information of the adjacent data units. Also, a corresponding coding unit corresponding to a coded depth is determined by using encoding information of a data unit, and thus a distribution of coded depths in a maximum coding unit may be determined.

Accordingly, if a current coding unit is predicted based on encoding information of adjacent data units, encoding information of data units in deeper coding units adjacent to the current coding unit may be directly referred to and used.

Alternatively, if a current coding unit is predicted based on encoding information of adjacent data units, data units adjacent to the current coding unit are searched using encoded information of the data units, and the searched adjacent coding units may be referred for predicting the current coding unit.

Figure 20:
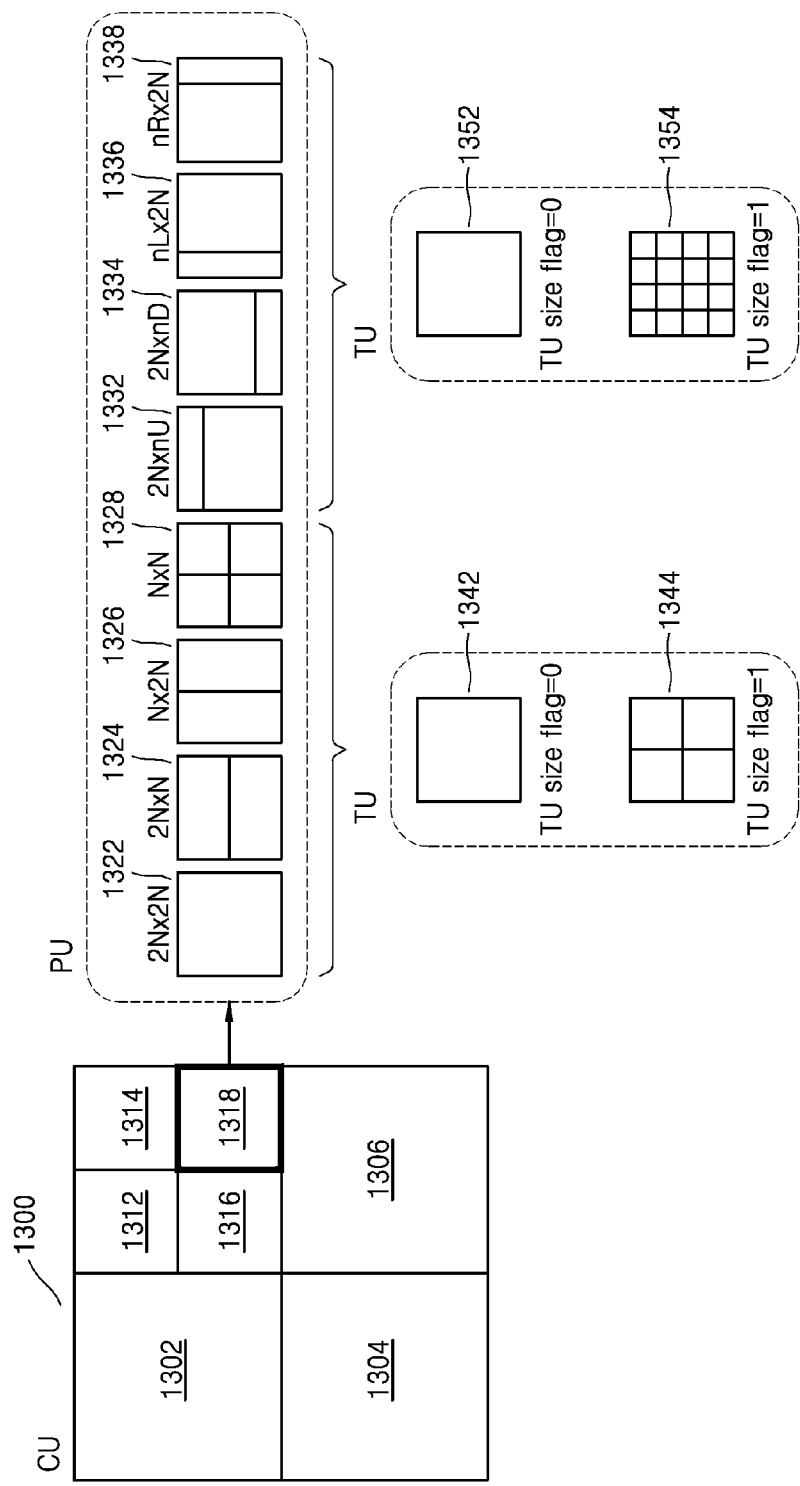
FIG. 20 is a diagram for describing a relationship between a coding unit, a prediction unit, and a transformation unit, according to encoding mode information of Table 1.

FIG. 20 is a diagram for describing a relationship between a coding unit, a prediction unit, and a transformation unit, according to encoding mode information of Table 5.

A maximum coding unit 1300 includes coding units 1302, 1304, 1306, 1312, 1314, 1316, and 1318 of coded depths. Here, since the coding unit 1318 is a coding unit of a coded depth, split information may be set to 0. Information about a partition type of the coding unit 1318 having a size of 2N×2N may be set to be one of a partition type 1322 having a size of 2N×2N, a partition type 1324 having a size of 2N×N, a partition type 1326 having a size of N×2N, a partition type 1328 having a size of N×N, a partition type 1332 having a size of 2N×nU, a partition type 1334 having a size of 2N×nD, a partition type 1336 having a size of nL×2N, and a partition type 1338 having a size of nR×2N.

Split information (TU size flag) of a transformation unit is a type of a transformation index. The size of the transformation unit corresponding to the transformation index may be changed according to a prediction unit type or partition type of the coding unit.

For example, when the partition type is set to be symmetrical, i.e. the partition type 1322, 1324, 1326, or 1328, a transformation unit 1342 having a size of 2N×2N is set if a TU size flag of a transformation unit is 0, and a transformation unit 1344 having a size of N×N is set if a TU size flag is 1.

When the partition type is set to be asymmetrical, i.e., the partition type 1332, 1334, 1336, or 1338, a transformation unit 1352 having a size of 2N×2N is set if a TU size flag is 0, and a transformation unit 1354 having a size of N/2×N/2 is set if a TU size flag is 1.

Referring to FIG. 20, the TU size flag is a flag having a value or 0 or 1, but the TU size flag according to an embodiment is not limited to 1 bit, and a transformation unit may be hierarchically split having a tree structure while the TU size flag increases from 0. Split information (TU size flag) of a transformation unit may be an example of a transformation index.

In this case, the size of a transformation unit that has been actually used may be expressed by using a TU size flag of a transformation unit, according to an embodiment, together with a maximum size and minimum size of the transformation unit. The video encoding apparatus 100 according to an embodiment is capable of encoding maximum transformation unit size information, minimum transformation unit size information, and a maximum TU size flag. The result of encoding the maximum transformation unit size information, the minimum transformation unit size information, and the maximum TU size flag may be inserted into an SPS. The video decoding apparatus 200 according to an embodiment may decode video by using the maximum transformation unit size information, the minimum transformation unit size information, and the maximum TU size flag.

For example, (a) if the size of a current coding unit is 64×64 and a maximum transformation unit size is 32×32, (a–1) then the size of a transformation unit may be 32×32 when a TU size flag is 0, (a–2) may be 16×16 when the TU size flag is 1, and (a–3) may be 8×8 when the TU size flag is 2.

As another example, (b) if the size of the current coding unit is 32×32 and a minimum transformation unit size is 32×32, (b–1) then the size of the transformation unit may be 32×32 when the TU size flag is 0. Here, the TU size flag cannot be set to a value other than 0, since the size of the transformation unit cannot be less than 32×32.

As another example, (c) if the size of the current coding unit is 64×64 and a maximum TU size flag is 1, then the TU size flag may be 0 or 1. Here, the TU size flag cannot be set to a value other than 0 or 1.

Thus, if it is defined that the maximum TU size flag is 'MaxTransformSizeIndex', a minimum transformation unit size is 'MinTransformSize', and a transformation unit size is 'RootTuSize' when the TU size flag is 0, then a current minimum transformation unit size 'CurrMinTuSize' that can be determined in a current coding unit, may be defined by Equation (1):

$$\text{CurrMinTuSize} = \max(\text{MinTransformSize}, \text{RootTuSize}/(2^{\text{MaxTransformSizeIndex}})) \quad (1)$$

Compared to the current minimum transformation unit size 'CurrMinTuSize' that can be determined in the current coding unit, a transformation unit size 'RootTuSize' when the TU size flag is 0 may denote a maximum transformation unit size that can be selected in the system. In Equation (1), 'RootTuSize/(2^MaxTransformSizeIndex)' denotes a transformation unit size when the transformation unit size 'RootTuSize', when the TU size flag is 0, is split a number of times corresponding to the maximum TU size flag, and 'MinTransformSize' denotes a minimum transformation size. Thus, a smaller value from among 'RootTuSize/(2^MaxTransformSizeIndex)' and 'MinTransformSize' may be the current minimum transformation unit size 'CurrMinTuSize' that can be determined in the current coding unit.

According to an embodiment, the maximum transformation unit size RootTuSize may vary according to the type of a prediction mode.

For example, if a current prediction mode is an inter mode, then 'RootTuSize' may be determined by using Equation (2) below. In Equation (2), 'MaxTransformSize' denotes a maximum transformation unit size, and 'PUSize' denotes a current prediction unit size.

$$RootTuSize=min(MaxTransformSize, PUSize) \qquad (2)$$

That is, if the current prediction mode is the inter mode, the transformation unit size 'RootTuSize', when the TU size flag is 0, may be a smaller value from among the maximum transformation unit size and the current prediction unit size.

If a prediction mode of a current partition unit is an intra mode, 'RootTuSize' may be determined by using Equation (3) below. In Equation (3), 'PartitionSize' denotes the size of the current partition unit.

$$RootTuSize=min(MaxTransformSize, PartitionSize) \qquad (3)$$

That is, if the current prediction mode is the intra mode, the transformation unit size 'RootTuSize' when the TU size flag is 0 may be a smaller value from among the maximum transformation unit size and the size of the current partition unit.

However, the current maximum transformation unit size 'RootTuSize' that varies according to the type of a prediction mode in a partition unit is just an example and the present disclosure is not limited thereto.

According to the video encoding method based on coding units having a tree structure as described with reference to FIGS. 8 through 20, image data of a spatial region is encoded for each coding unit of a tree structure. According to the video decoding method based on coding units having a tree structure, decoding is performed for each maximum coding unit to reconstruct image data of a spatial region. Thus, a picture and a video that is a picture sequence may be reconstructed. The reconstructed video may be reproduced by a reproducing apparatus, stored in a storage medium, or transmitted through a network.

The embodiments according to the present disclosure may be written as computer programs and may be implemented in general-use digital computers that execute the programs using a computer-readable recording medium. Examples of the computer-readable recording medium include magnetic storage media (e.g., ROM, floppy discs, hard discs, etc.) and optical recording media (e.g., CD-ROMs, or DVDs).

For convenience of description, the video stream encoding method and/or the video encoding method described above with reference to FIGS. 1A through 20 will be collectively referred to as a 'video encoding method of the present disclosure'. In addition, the video stream decoding method and/or the video decoding method described above with reference to FIGS. 1A through 20 will be referred to as a 'video decoding method of the present disclosure'.

Also, a video encoding apparatus including the video encoding apparatus 70, the video encoding apparatus 100, or the image encoder 400, which has been described with reference to FIGS. 1A through 20, will be referred to as a 'video encoding apparatus of the present disclosure'. In addition, a video decoding apparatus including the video decoding apparatus 70, the video decoding apparatus 200, or the image decoder 500, which has been descried with reference to FIGS. 1A through 20, will be referred to as a 'video decoding apparatus of the present disclosure'.

A computer-readable recording medium storing a program, e.g., a disc 26000, according to an embodiment of the present disclosure will now be described in detail.

Figure 21:
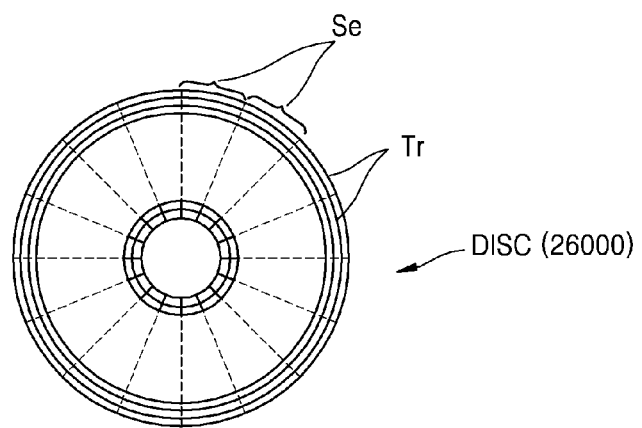
FIG. 21 is a diagram of a physical structure of a disc in which a program is stored, according to various embodiments.

FIG. 21 is a diagram of a physical structure of the disc 26000 in which a program is stored, according to various embodiments. The disc 26000, which is a storage medium, may be a hard drive, a compact disc-read only memory (CD-ROM) disc, a Blu-ray disc, or a digital versatile disc (DVD). The disc 26000 includes a plurality of concentric tracks Tr that are each divided into a specific number of sectors Se in a circumferential direction of the disc 26000. In a specific region of the disc 26000 according to the embodiment, a program that executes the quantization parameter determining method, the video encoding method, and the video decoding method described above may be assigned and stored.

A computer system embodied using a storage medium that stores a program for executing the video encoding method and the video decoding method as described above will now be described with reference to FIG. 22.

Figure 22:
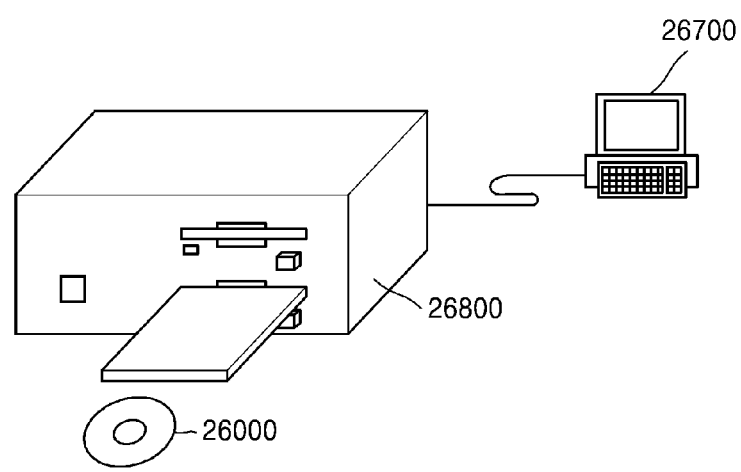
FIG. 22 is a diagram of a disc drive for recording and reading a program by using a disc.

FIG. 22 is a diagram of a disc drive 26800 for recording and reading a program by using the disc 26000. A computer system 27000 may store a program that executes at least one of the video encoding method and the video decoding method of the present disclosure, in the disc 26000 via the disc drive 26800. To run the program stored in the disc 26000 in the computer system 27000, the program may be read from the disc 26000 and be transmitted to the computer system 26700 by using the disc drive 27000.

The program that executes at least one of the video encoding method and the video decoding method of the present disclosure may be stored not only in the disc 26000 illustrated in FIG. 21 or 22 but also in a memory card, a ROM cassette, or a solid state drive (SSD).

A system to which the video encoding method and a video decoding method described above are applied will be described below.

Figure 23:
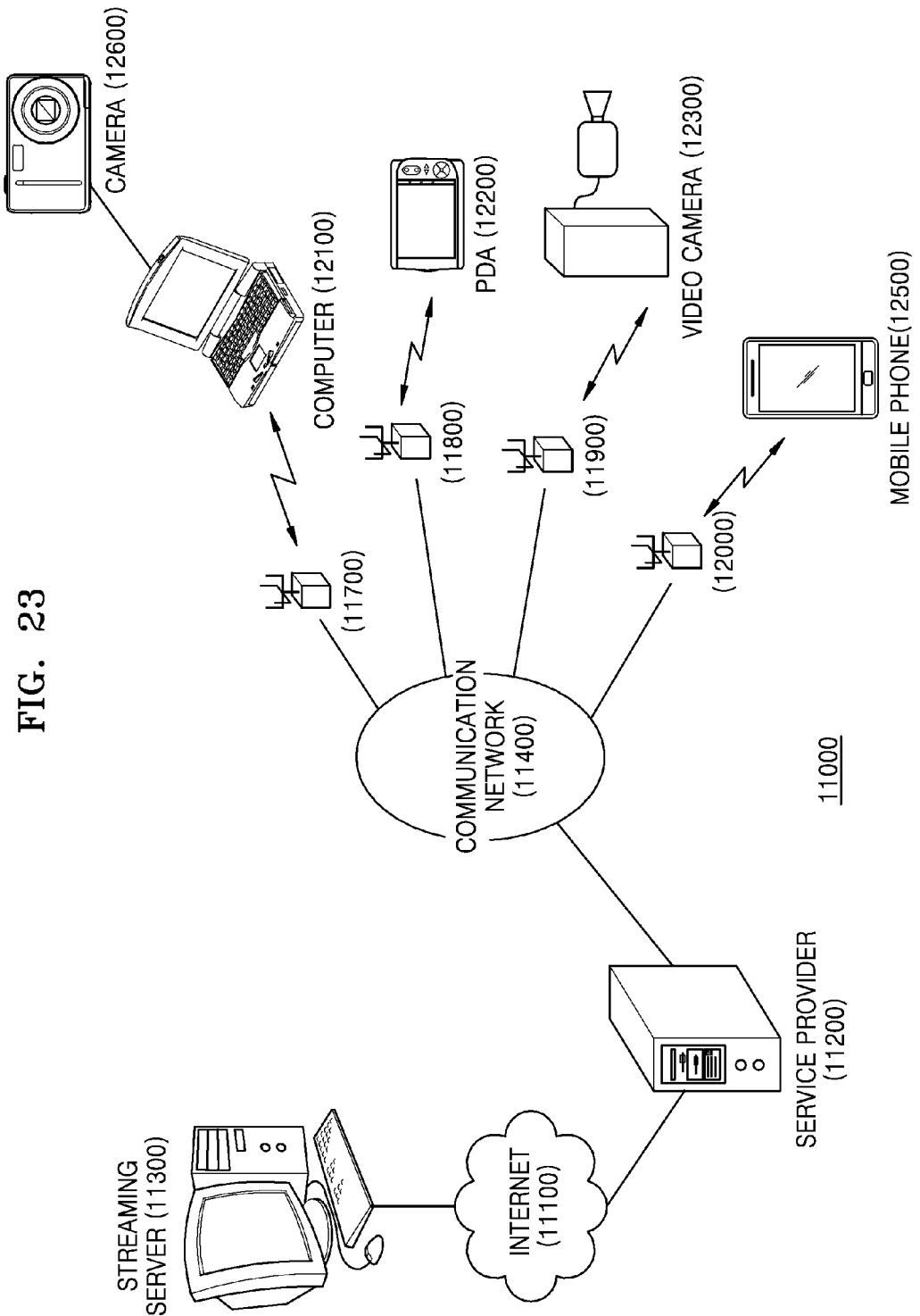
FIG. 23 is a diagram of an overall structure of a content supply system for providing a content distribution service.

FIG. 23 is a diagram of an overall structure of a content supply system 11000 for providing a content distribution service. A service area of a communication system is divided into predetermined-sized cells, and wireless base stations 11700, 11800, 11900, and 12000 are installed in these cells, respectively.

The content supply system 11000 includes a plurality of independent devices. For example, the plurality of independent devices, such as a computer 12100, a personal digital assistant (PDA) 12200, a video camera 12300, and a mobile phone 12500, are connected to the Internet 11100 via an internet service provider 11200, a communication network 11400, and the wireless base stations 11700, 11800, 11900, and 12000.

Figure 24:
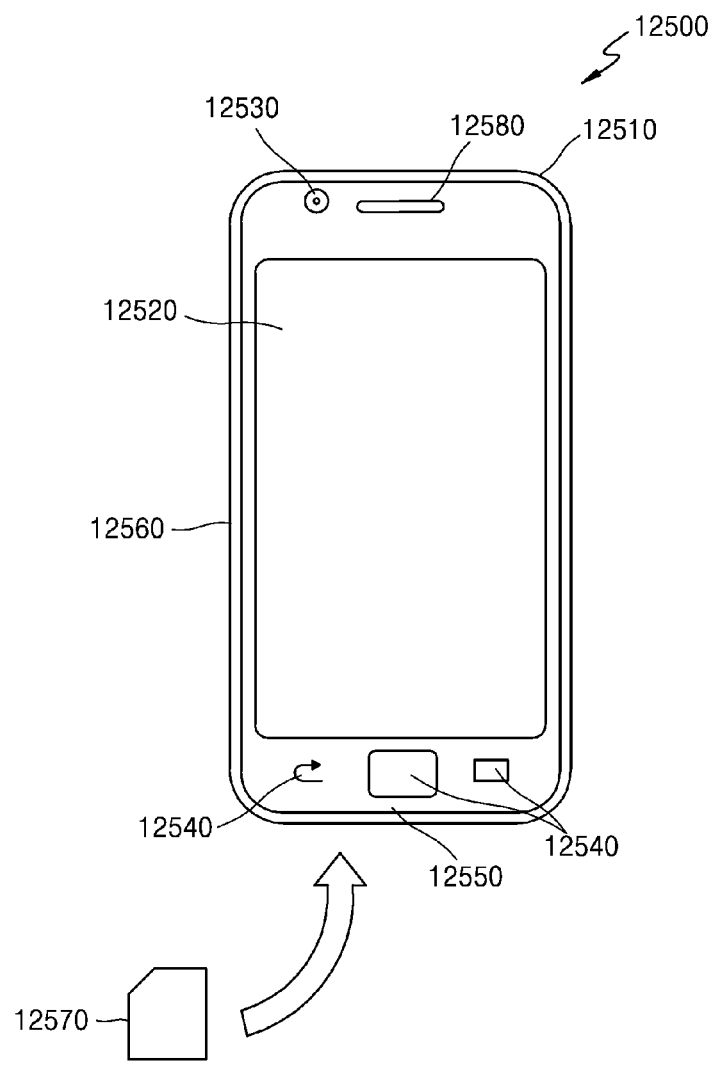
FIGS. 24 and 25 are diagrams respectively of an external structure and an internal structure of a mobile phone to which a video encoding method and a video decoding method are applied, according to various embodiments.

However, the content supply system 11000 is not limited to as illustrated in FIG. 24, and devices may be selectively connected thereto. The plurality of independent devices may be directly connected to the communication network 11400, not via the wireless base stations 11700, 11800, 11900, and 12000.

The video camera 12300 is an imaging device, e.g., a digital video camera, which is capable of capturing video images. The mobile phone 12500 may employ at least one communication method from among various protocols, e.g., Personal Digital Communications (PDC), Code Division Multiple Access (CDMA), Wideband-Code Division Multiple Access (W-CDMA), Global System for Mobile Communications (GSM), and Personal Handyphone System (PHS).

The video camera 12300 may be connected to a streaming server 11300 via the wireless base station 11900 and the communication network 11400. The streaming server 11300 allows content received from a user via the video camera 12300 to be streamed via a real-time broadcast. The content received from the video camera 12300 may be encoded using the video camera 12300 or the streaming server 11300. Video data captured by the video camera 12300 may be transmitted to the streaming server 11300 via the computer 12100.

Video data captured by a camera 12600 may also be transmitted to the streaming server 11300 via the computer 12100. The camera 12600 is an imaging device capable of capturing both still images and video images, similar to a digital camera. The video data captured by the camera 12600 may be encoded using the camera 12600 or the computer 12100. Software that performs encoding and decoding video may be stored in a computer-readable recording medium, e.g., a CD-ROM disc, a floppy disc, a hard disc drive, an SSD, or a memory card, which may be accessible by the computer 12100.

If video data is captured by a camera built in the mobile phone 12500, the video data may be received from the mobile phone 12500.

The video data may also be encoded by a large scale integrated circuit (LSI) system installed in the video camera 12300, the mobile phone 12500, or the camera 12600.

The content supply system 11000 according to an embodiment may encode content data recorded by a user using the video camera 12300, the camera 12600, the mobile phone 12500, or another imaging device, e.g., content recorded during a concert, and transmit the encoded content data to the streaming server 11300. The streaming server 11300 may transmit the encoded content data in a type of a streaming content to other clients that request the content data.

The clients are devices capable of decoding the encoded content data, e.g., the computer 12100, the PDA 12200, the video camera 12300, or the mobile phone 12500. Thus, the content supply system 11000 allows the clients to receive and reproduce the encoded content data. Also, the content supply system 11000 allows the clients to receive the encoded content data and decode and reproduce the encoded content data in real time, thereby enabling personal broadcasting.

Encoding and decoding operations of the plurality of independent devices included in the content supply system 11000 may be similar to those of the video encoding apparatus and the video decoding apparatus of the present disclosure.

The mobile phone 12500 included in the content supply system 11000 according to an embodiment will now be described in greater detail with referring to FIGS. 24 and 25.

FIG. 24 illustrates an external structure of the mobile phone 12500 to which the video encoding method and the video decoding method of the present disclosure are applied, according to various embodiments. The mobile phone 12500 may be a smart phone, the functions of which are not limited and a large number of the functions of which may be changed or expanded.

The mobile phone 12500 includes an internal antenna 12510 via which a radio-frequency (RF) signal may be exchanged with the wireless base station 12000 of FIG. 21, and includes a display screen 12520 for displaying images captured by a camera 12530 or images that are received via the antenna 12510 and decoded, e.g., a liquid crystal display (LCD) or an organic light-emitting diode (OLED) screen. The mobile phone 12500 includes an operation panel 12540 including a control button and a touch panel. If the display screen 12520 is a touch screen, the operation panel 12540 further includes a touch sensing panel of the display screen 12520. The mobile phone 12500 includes a speaker 12580 for outputting voice and sound or another type of sound output unit, and a microphone 12550 for inputting voice and sound or another type sound input unit. The mobile phone 12500 further includes the camera 12530, such as a charge-coupled device (CCD) camera, to capture video and still images. The mobile phone 12500 may further include a storage medium 12570 for storing encoded/decoded data, e.g., video or still images captured by the camera 12530, received via email, or obtained according to various ways; and a slot 12560 via which the storage medium 12570 is loaded into the mobile phone 12500. The storage medium 12570 may be a flash memory, e.g., a secure digital (SD) card or an electrically erasable and programmable read only memory (EEPROM) included in a plastic case.

Figure 25:
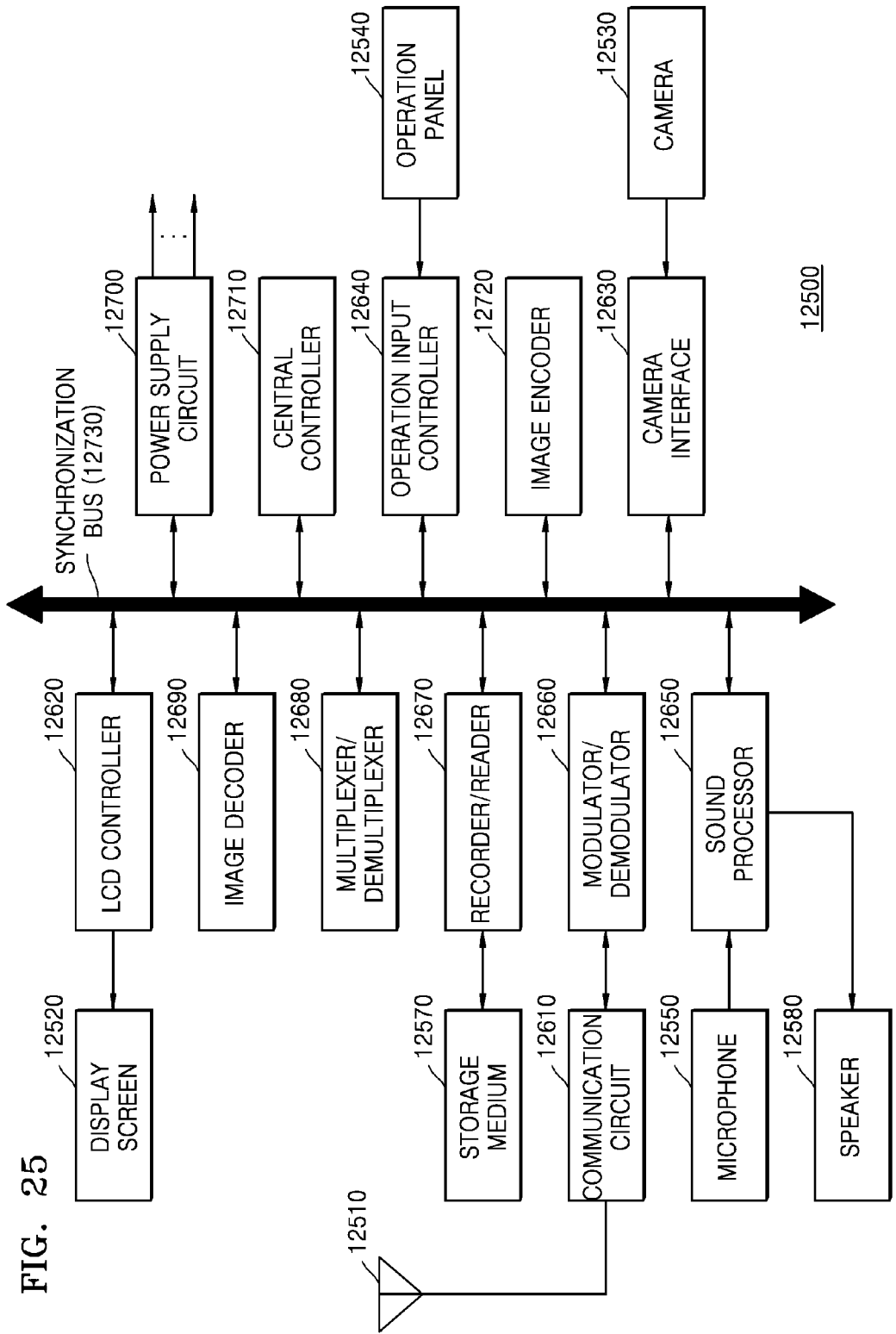

FIG. 25 illustrates an internal structure of the mobile phone 12500, according to an embodiment of the present disclosure. To systemically control parts of the mobile phone 12500 including the display screen 12520 and the operation panel 12540, a power supply circuit 12700, an operation input controller 12640, an image encoding unit 12720, a camera interface 12630, an LCD controller 12620, an image decoding unit 12690, a multiplexer/demultiplexer 12680, a recording/reading unit 12670, a modulation/demodulation unit 12660, and a sound processor 12650 are connected to a central controller 12710 via a synchronization bus 12730.

If a user operates a power button and sets from a 'power off' state to a power on' state, the power supply circuit 12700 supplies power to all the parts of the mobile phone 12500 from a battery pack, thereby setting the mobile phone 12500 in an operation mode.

The central controller 12710 includes a central processing unit (CPU), a ROM, and a RAM.

While the mobile phone 12500 transmits communication data to the outside, a digital signal is generated by the mobile phone 12500 under control of the central controller 12710. For example, the sound processor 12650 may generate a digital sound signal, the image encoding unit 12720 may generate a digital image signal, and text data of a message may be generated via the operation panel 12540 and the operation input controller 12640. When a digital signal is transmitted to the modulation/demodulation unit 12660 under control of the central controller 12710, the modulation/demodulation unit 12660 modulates a frequency band of the digital signal, and a communication circuit 12610 performs digital-to-analog conversion (DAC) and frequency conversion on the frequency band-modulated digital sound signal. A transmission signal output from the communication circuit 12610 may be transmitted to a voice communication base station or the wireless base station 12000 via the antenna 12510.

For example, when the mobile phone 12500 is in a conversation mode, a sound signal obtained via the microphone 12550 is transformed into a digital sound signal by the sound processor 12650, under control of the central controller 12710. The digital sound signal may be transformed into a transformation signal via the modulation/demodulation unit 12660 and the communication circuit 12610, and may be transmitted via the antenna 12510.

When a text message, e.g., email, is transmitted in a data communication mode, text data of the text message is input via the operation panel 12540 and is transmitted to the central controller 12610 via the operation input controller 12640. Under control of the central controller 12610, the text data is transformed into a transmission signal via the modulation/demodulation unit 12660 and the communication circuit 12610 and is transmitted to the wireless base station 12000 via the antenna 12510.

To transmit image data in the data communication mode, image data captured by the camera 12530 is provided to the image encoding unit 12720 via the camera interface 12630. The captured image data may be directly displayed on the display screen 12520 via the camera interface 12630 and the LCD controller 12620.

A structure of the image encoding unit 12720 may correspond to that of the video encoding apparatus 100 described above. The image encoding unit 12720 may transform the image data received from the camera 12530 into compressed and encoded image data according to the video encoding method of the present disclosure described above, and then output the encoded image data to the multiplexer/demultiplexer 12680. During a recording operation of the camera 12530, a sound signal obtained by the microphone 12550 of the mobile phone 12500 may be transformed into digital sound data via the sound processor 12650, and the digital sound data may be transmitted to the multiplexer/demultiplexer 12680.

The multiplexer/demultiplexer 12680 multiplexes the encoded image data received from the image encoding unit 12720, together with the sound data received from the sound processor 12650. A result of multiplexing the data may be transformed into a transmission signal via the modulation/demodulation unit 12660 and the communication circuit 12610, and may then be transmitted via the antenna 12510.

While the mobile phone 12500 receives communication data from the outside, frequency recovery and ADC are performed on a signal received via the antenna 12510 to transform the signal into a digital signal. The modulation/demodulation unit 12660 modulates a frequency band of the digital signal. The frequency-band modulated digital signal is transmitted to the video decoding unit 12690, the sound processor 12650, or the LCD controller 12620, according to the type of the digital signal.

In the conversation mode, the mobile phone 12500 amplifies a signal received via the antenna 12510, and obtains a digital sound signal by performing frequency conversion and ADC on the amplified signal. A received digital sound signal is transformed into an analog sound signal via the modulation/demodulation unit 12660 and the sound processor 12650, and the analog sound signal is output via the speaker 12580, under control of the central controller 12710.

When in the data communication mode, data of a video file accessed at an Internet website is received, a signal received from the wireless base station 12000 via the antenna 12510 is output as multiplexed data via the modulation/demodulation unit 12660, and the multiplexed data is transmitted to the multiplexer/demultiplexer 12680.

To decode the multiplexed data received via the antenna 12510, the multiplexer/demultiplexer 12680 demultiplexes the multiplexed data into an encoded video data stream and an encoded audio data stream. Via the synchronization bus 12730, the encoded video data stream and the encoded audio data stream are provided to the video decoding unit 12690 and the sound processor 12650, respectively.

A structure of the image decoding unit 12690 may correspond to that of the video decoding apparatus of the present disclosure described above. The image decoding unit 12690 may decode the encoded video data to obtain reconstructed video data and provide the reconstructed video data to the display screen 12520 via the LCD controller 12620, by using the video decoding method of the present disclosure described above.

Thus, the data of the video file accessed at the Internet website may be displayed on the display screen 12520. At the same time, the sound processor 12650 may transform audio data into an analog sound signal, and provide the analog sound signal to the speaker 12580. Thus, audio data contained in the video file accessed at the Internet website may also be reproduced via the speaker 12580.

The mobile phone 12500 or another type of communication terminal may be a transceiving terminal including both the video encoding apparatus and the video decoding apparatus of the present disclosure, may be a transceiving terminal including only the video encoding apparatus of the present disclosure, or may be a transceiving terminal including only the video decoding apparatus of the present disclosure.

Figure 26:
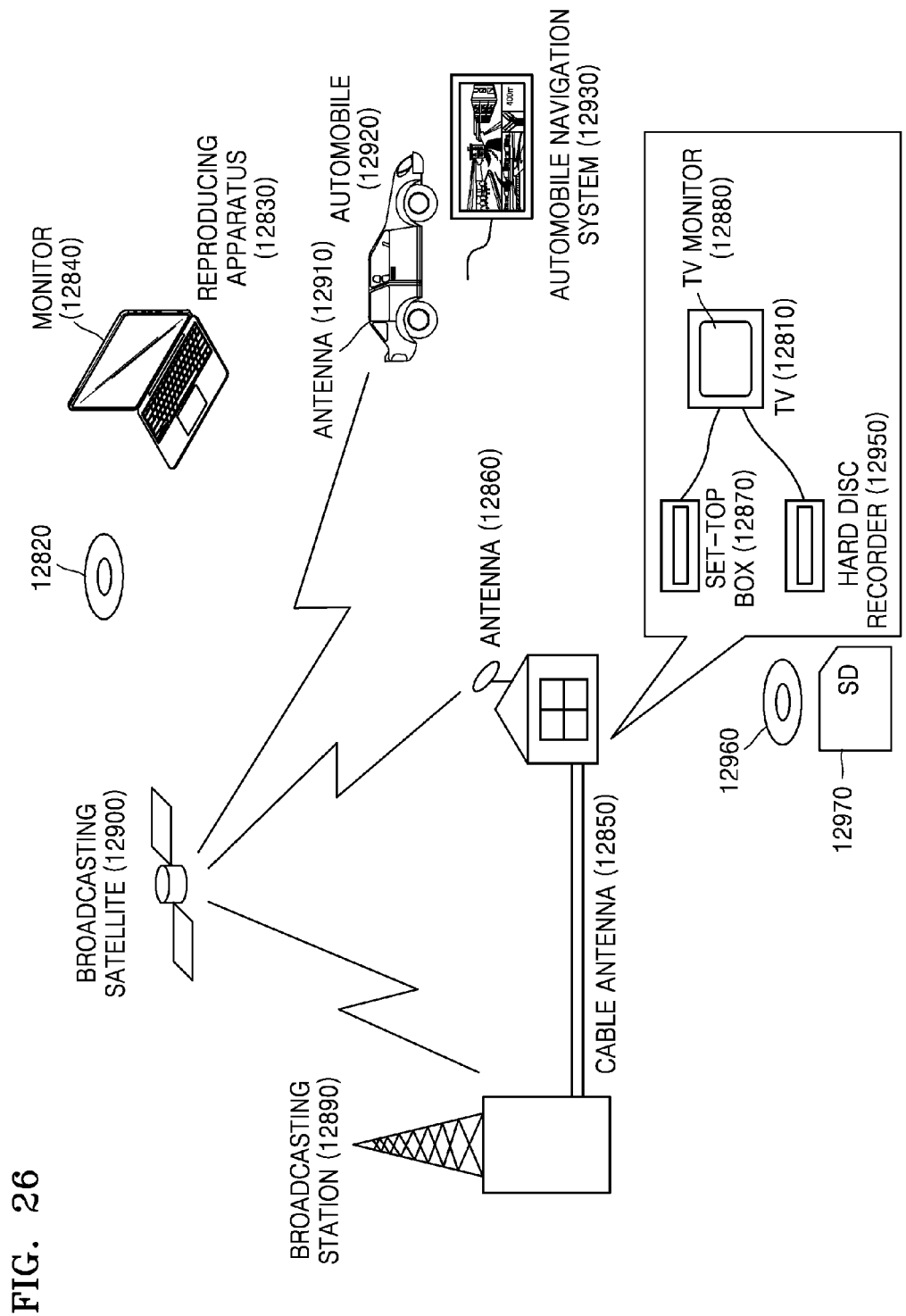
FIG. 26 is a diagram of a digital broadcast system to which a communication system is applied, according to various embodiments.

A communication system according to the present disclosure is not limited to the communication system described above with reference to FIG. 24. For example, FIG. 26 illustrates a digital broadcasting system employing a communication system, according to various embodiments. The digital broadcasting system of FIG. 26 according to an embodiment may receive a digital broadcast transmitted via a satellite or a terrestrial network by using the video encoding apparatus and the video decoding apparatus of the present disclosure.

Specifically, a broadcasting station 12890 transmits a video data stream to a communication satellite or a broadcasting satellite 12900 by using radio waves. The broadcasting satellite 12900 transmits a broadcast signal, and the broadcast signal is transmitted to a satellite broadcast receiver via a household antenna 12860. In every house, an encoded video stream may be decoded and reproduced by a TV receiver 12810, a set-top box 12870, or another device.

When the video decoding apparatus of the present disclosure is implemented in a reproducing apparatus 12830, the reproducing apparatus 12830 may parse and decode an encoded video stream recorded on a storage medium 12820, such as a disc or a memory card to reconstruct digital signals. Thus, the reconstructed video signal may be reproduced, for example, on a monitor 12840.

In the set-top box 12870 connected to the antenna 12860 for a satellite/terrestrial broadcast or a cable antenna 12850 for receiving a cable television (TV) broadcast, the video decoding apparatus of the present disclosure may be installed. Data output from the set-top box 12870 may also be reproduced on a TV monitor 12880.

As another example, the video decoding apparatus of the present disclosure may be installed in the TV receiver 12810 instead of the set-top box 12870.

An automobile 12920 that has an appropriate antenna 12910 may receive a signal transmitted from the satellite 12900 or the wireless base station 11700 of FIG. 23. A decoded video may be reproduced on a display screen of an automobile navigation system 12930 installed in the automobile 12920.

A video signal may be encoded by the video encoding apparatus of the present disclosure and may then be stored in a storage medium. Specifically, an image signal may be stored in a DVD disc 12960 by a DVD recorder or may be stored in a hard disc by a hard disc recorder 12950. As another example, the video signal may be stored in an SD card 12970. If the hard disc recorder 12950 includes the video decoding apparatus of the present disclosure according to an embodiment, a video signal recorded on the DVD disc 12960, the SD card 12970, or another storage medium may be reproduced on the TV monitor 12880.

The automobile navigation system 12930 may not include the camera 12530, the camera interface 12630, and the image encoding unit 12720 of FIG. 26. For example, the computer 12100 and the TV receiver 12810 may not be included in the camera 12530, the camera interface 12630, and the image encoding unit 12720 of FIG. 26.

Figure 27:
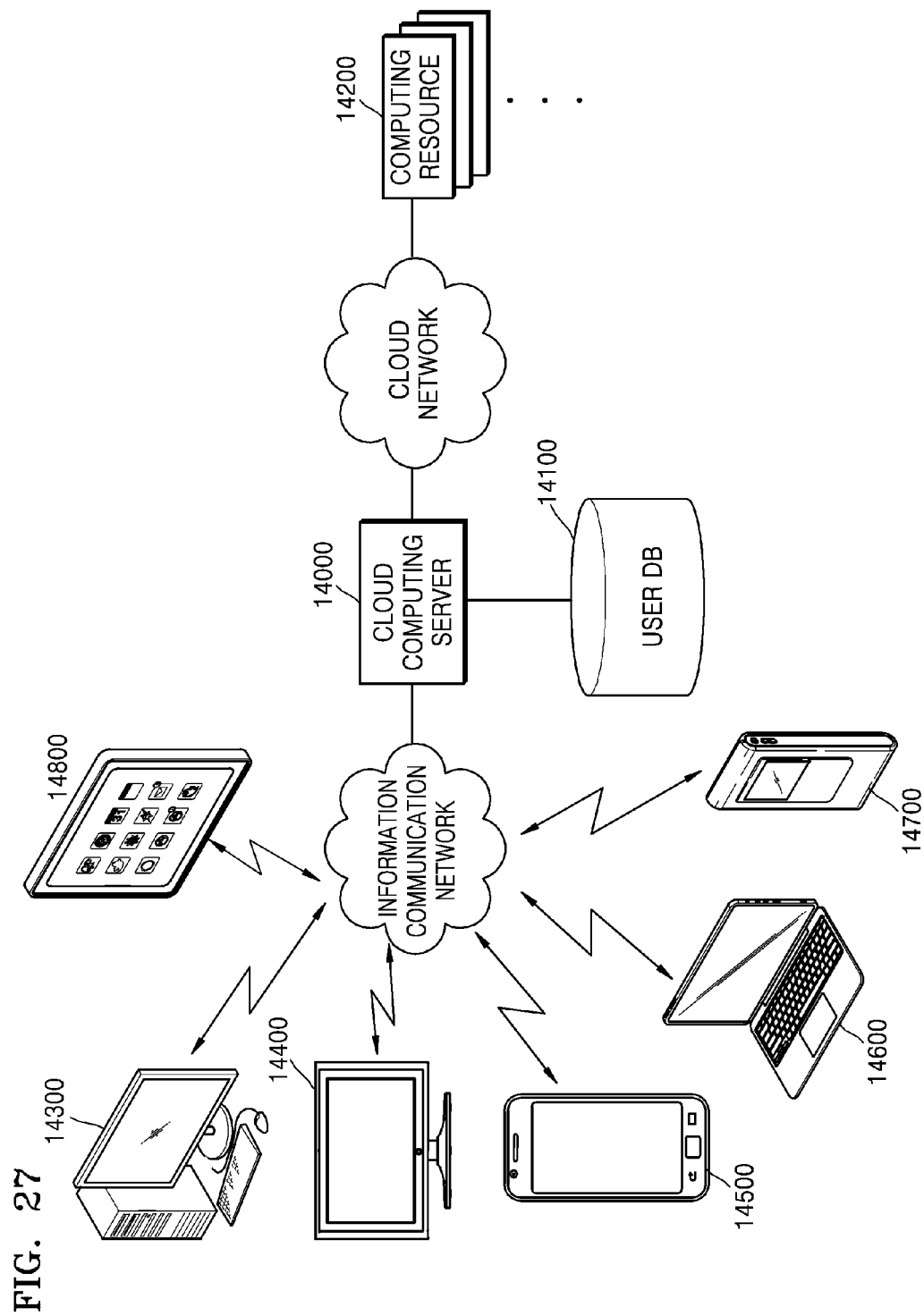
FIG. 27 is a diagram illustrating a network structure of a cloud computing system using a video encoding apparatus and a video decoding apparatus, according to various embodiments.

FIG. 27 is a diagram illustrating a network structure of a cloud computing system using a video encoding apparatus and a video decoding apparatus, according to various embodiments.

The cloud computing system of the present disclosure may include a cloud computing server 14000, a user database (DB) 14100, a plurality of computing resources 14200, and a user terminal.

The cloud computing system provides an on-demand outsourcing service of the plurality of computing resources 14200 via a data communication network, e.g., the Internet, in response to a request from the user terminal. Under a cloud computing environment, a service provider provides users with desired services by combining computing resources at data centers located at physically different locations by using virtualization technology. A service user does not have to install computing resources, e.g., an application, a storage, an operating system (OS), and security, into his/her own terminal in order to use them, but may select and use desired services from among services in a virtual space generated through the virtualization technology, at a desired point in time.

A user terminal of a specified service user is connected to the cloud computing server 14000 via a data communication network including the Internet and a mobile telecommunication network. User terminals may be provided cloud computing services, and particularly video reproduction services, from the cloud computing server 14000. The user terminals may be various types of electronic devices capable of being connected to the Internet, e.g., a desktop PC 14300, a smart TV 14400, a smart phone 14500, a notebook computer 14600, a portable multimedia player (PMP) 14700, a tablet PC 14800, and the like.

The cloud computing server 14000 may combine the plurality of computing resources 14200 distributed in a cloud network and provide user terminals with a result of combining. The plurality of computing resources 14200 may include various data services, and may include data uploaded from user terminals. As described above, the cloud computing server 14000 may provide user terminals with desired services by combining video database distributed in different regions according to the virtualization technology.

User information about users who have subscribed for a cloud computing service is stored in the user DB 14100. The user information may include logging information, addresses, names, and personal credit information of the users. The user information may further include indexes of videos. Here, the indexes may include a list of videos that have already been reproduced, a list of videos that are being reproduced, a pausing point of a video that was being reproduced, and the like.

Information about a video stored in the user DB 14100 may be shared between user devices. For example, when a video service is provided to the notebook computer 14600 in response to a request from the notebook computer 14600, a reproduction history of the video service is stored in the user DB 14100. When a request to reproduce this video service is received from the smart phone 14500, the cloud computing server 14000 searches for and reproduces this video service, based on the user DB 14100. When the smart phone 14500 receives a video data stream from the cloud computing server 14000, a process of reproducing video by decoding the video data stream is similar to an operation of the mobile phone 12500 described above with reference to FIG. 24.

The cloud computing server 14000 may refer to a reproduction history of a desired video service, stored in the user DB 14100. For example, the cloud computing server 14000 receives a request to reproduce a video stored in the user DB 14100, from a user terminal. If this video was being reproduced, then a method of streaming this video, performed by the cloud computing server 14000, may vary according to the request from the user terminal, i.e., according to whether the video will be reproduced, starting from a start thereof or a pausing point thereof. For example, if the user terminal requests to reproduce the video, starting from the start thereof, the cloud computing server 14000 transmits streaming data of the video starting from a first frame thereof to the user terminal. If the user terminal requests to reproduce the video, starting from the pausing point thereof, the cloud computing server 14000 transmits streaming data of the video starting from a frame corresponding to the pausing point, to the user terminal.

In this case, the user terminal may include the video decoding apparatus of the present disclosure described above with reference to FIGS. 1A to 20. As another example, the user terminal may include the video encoding apparatus of the present disclosure described above with reference to FIGS. 1A to 20. Alternatively, the user terminal may include both the video decoding apparatus and the video encoding apparatus of the present disclosure described above with reference to FIGS. 1A to 20.

Various applications of a video encoding method, a video decoding method, a video encoding apparatus, and a video decoding apparatus according to embodiments described above with reference to FIGS. 1A to 20 have been described above with reference to FIGS. 21 to 27. However, methods of storing the video encoding method and the video decoding method in a storage medium or methods of implementing the video encoding apparatus and the video decoding apparatus in a device, according to various embodiments, are not limited to the embodiments described above with reference to FIGS. 21 to 27.

It will be understood by those of ordinary skill in the art that various changes in form and details may be made in various embodiments without departing from the spirit and scope of the embodiments described herein. The embodiments should be considered in a descriptive sense only and not for purposes of limitation. Therefore, the scope of the present disclosure is defined not by the detailed description of the present disclosure but by the appended claims, and all differences within the scope will be construed as being included in the present disclosure.

The invention claimed is:

1. A video decoding method comprising:
obtaining reference image data from a bitstream;
determining a reference region that is a rectangular area split from a reference picture, the reference region comprising a plurality of reference image data and each of the plurality of reference image data being data of a rectangular area;
determining a frequency of references to the reference region referred by image data to be decoded, wherein the frequency of references to the reference region is determined as a sum of frequencies of the references to each of the plurality of the reference image data of the reference region referred by the image data to be decoded;
identifying all of the plurality of the reference image data of the reference region as a first reference image data or a second reference image data, by comparing the frequency of the references to the reference region and a reference value, wherein the first reference image data has a higher frequency of reference by the image data to be decoded than the second reference image data;
storing the identified plurality of reference image data in a memory; and
decoding the image data by using the identified reference image data stored in the memory,
wherein when a reference image data is comprised in the reference region and another reference region, a frequency of references to the reference image data is added to the frequency of references to the reference region and a frequency of references to the another reference region.

2. The video decoding method of claim 1, wherein the sum of the frequencies of the references to each of the plurality of the reference image data of the reference region is determined according to a sum of motion vectors of the image data to be decoded referring to each of the plurality of the reference image data.

3. The video decoding method of claim 1, wherein the identifying comprises identifying the plurality of the reference image data of the reference region as the first reference image data when the frequency of the references to the reference region is equal to or higher than the reference value, and identifying the plurality of the reference image data of the reference region as the second reference image data when the frequency of the references to the reference region is lower than the reference value.

4. The video decoding method of claim 1, wherein rectangular area is a square.

5. The video decoding method of claim 1, wherein the storing comprises storing the identified plurality of reference image data according to a replacement policy based on identifying the plurality of the reference image data of the reference region as a first reference image data or a second reference image data.

6. A video encoding method comprising:
obtaining reference image data by encoding a reference picture;
determining a reference region that is a rectangular area split from the reference picture, the reference region comprising a plurality of reference image data and each of the plurality of reference image data being data of a rectangular area;
determining a frequency of references to the reference region referred by image data to be encoded, wherein the frequency of references to the reference region is determined as a sum of frequencies of the references to each of the plurality of the reference image data of the reference region referred by the image data to be encoded;
identifying all of the plurality of reference image data of the reference region as a first reference image data or a second reference image data, by comparing the frequency of the references to the reference region and a reference value, wherein the first reference image data has a higher frequency of reference by the image data to be encoded than the second reference data;
storing the identified plurality of reference image data in a memory; and
generating a bitstream comprising the image data encoded based on the identified reference image data,
wherein when a reference image data is comprised in the reference region and another reference region, a frequency of references to the reference image data is added to the frequency of references to the reference region and a frequency of references to the another reference region.

7. A video decoding apparatus comprising:
a bitstream parser configured to obtain reference image data from a bitstream, determine a reference region that is a rectangular area split from a reference picture, the reference region comprising a plurality of reference image data and each of the plurality of reference image data being data of a rectangular area, determine a frequency of references to the reference region referred by image data to be decoded, wherein the frequency of references to the reference region is determined as a sum of frequencies of the references to each of the plurality of the reference image data of the reference region referred by the image data to be decoded, and identify all of the plurality of the reference image data of the reference region as a first reference image data or a second reference image data, by comparing the frequency of the references to the reference region and a reference value, wherein the first reference image data has a higher frequency of reference by the image data to be decoded than the second reference image data; and
a decoder configured to store the identified plurality of reference image data in a memory, and decode the image data to be decoded by using the identified reference image data stored in the memory,
wherein when a reference image data is comprised in the reference region and another reference region, a frequency of references to the reference image data is added to the frequency of references to the reference region and a frequency of references to the another reference region.

8. A video encoding apparatus comprising:
an encoder configured to obtain reference image data by encoding a reference picture; and
a bitstream generator configured to determine a reference region that is a rectangular area split from the reference picture, the reference region comprising a plurality of reference image data and each of the plurality of reference image data being data of a rectangular area, determine a frequency of references to the reference region referred by image data to be encoded, wherein the frequency of references to the reference region is determined as a sum of frequencies of the references to each of the plurality of the reference image data of the reference region referred by the image data to be encoded, identify all of the plurality of the reference image data as a first reference image data or a second reference image data, by comparing the frequency of the references to the reference region and a reference value, wherein the first reference data has a higher frequency of reference by the image data to be encoded than the second reference data, and generate a bitstream comprising the image data encoded based on the identified reference image data, wherein the identified reference image data is stored in a memory, wherein when a reference image data is comprised in the reference region and another reference region, a frequency of references to the reference image data is added to the frequency of references to the reference region and a frequency of references to the another reference region.

9. A non-transitory computer-readable recording medium having recorded thereon a program which, when executed by a computer, performs the video decoding method of claim 1.

* * * * *